(12) United States Patent
Solomon et al.

(10) Patent No.: US 8,217,997 B2
(45) Date of Patent: Jul. 10, 2012

(54) INTERACTIVE DISPLAY SYSTEM

(75) Inventors: Yoram Solomon, Plano, TX (US);
Robert Finis Anderson, III, Frisco, TX (US); Hongjun Li, Plano, TX (US);
Gregory Brian Kalush, Colleyville, TX (US)

(73) Assignee: Interphase Corporation, Plano, TX (US)

( * ) Notice: Subject to any disclaimer, the term of this patent is extended or adjusted under 35 U.S.C. 154(b) by 45 days.

(21) Appl. No.: 13/025,015

(22) Filed: Feb. 10, 2011

(65) Prior Publication Data

US 2011/0227827 A1 Sep. 22, 2011

Related U.S. Application Data

(60) Provisional application No. 61/314,437, filed on Mar. 16, 2010.

(51) Int. Cl.
*H04N 9/47* (2006.01)
*H04N 7/18* (2006.01)

(52) U.S. Cl. .......................................................... 348/63

(58) Field of Classification Search .................. None
See application file for complete search history.

(56) References Cited

U.S. PATENT DOCUMENTS

| | | | |
|---|---|---|---|
| 5,933,135 A | 8/1999 | Martin | |
| 6,281,820 B1 | 8/2001 | Fields | |
| 6,346,933 B1 | 2/2002 | Lin | |
| 7,113,615 B2 * | 9/2006 | Rhoads et al. | 382/100 |
| 7,161,596 B2 | 1/2007 | Hoile | |
| 7,420,540 B2 | 9/2008 | Olbrich | |
| 7,421,111 B2 | 9/2008 | Dietz et al. | |
| 7,513,700 B2 | 4/2009 | Nelson | |
| 7,553,229 B2 | 6/2009 | Xing | |
| 2005/0260986 A1 | 11/2005 | Sun et al. | |
| 2007/0236451 A1 | 10/2007 | Ofek et al. | |
| 2008/0275667 A1 | 11/2008 | Ohta | |
| 2009/0132926 A1 | 5/2009 | Bucha | |
| 2010/0030578 A1 * | 2/2010 | Siddique et al. | 705/3 |
| 2011/0105103 A1 | 5/2011 | Ullrich | |

OTHER PUBLICATIONS

International Search Report and Written Opinion of the ISA, PCT International Application PCT/US2011/027376 (Nov. 28, 2011).
Smith, et al., "Interactive whiteboards: boon or bandwagon? A critical review of the literature", J. Computer Assisted Learning, vol. 21 (Blackwell Publishing Ltd., 2005), pp. 91-101.
Dell Inc., "The Dell S300wi Interactive Projector", product brochure (Dell Inc., Apr. 2010).
Infocus Corporation, "IN3900 (series)", product brochure (InFocus Corporation, 2009).

(Continued)

*Primary Examiner* — Nhon Diep
(74) *Attorney, Agent, or Firm* — Anderson & Levine, LLP

(57) ABSTRACT

An interactive display system including a wireless pointing device including a camera or other video capture system. The pointing device captures images displayed by the computer, including one or more human-imperceptible positioning targets. The positioning targets are presented as patterned modulation of the intensity (e.g., variation in pixel intensity) in a display frame of the visual payload, followed by the opposite modulation in a successive frame. At least two captured image frames are subtracted from one another to recover the positioning target in the captured visual data and to remove the displayed image payload. The location, size, and orientation of the recovered positioning target identify the aiming point of the remote pointing device relative to the display. Another embodiment uses temporal sequencing of positioning targets (either human-perceptible or human-imperceptible) to position the pointing device.

28 Claims, 19 Drawing Sheets

OTHER PUBLICATIONS

Nadel, "Magic Wand for the Classroom", Tech Tools blog, available at http://blogs.scholastic.com/techtools/2010/02/magic-wand-for-the-classroom.html (Feb. 24, 2010).

Park et al., "A Nonintrusive Method for Generating All-Focused Projection", Int'l Conf. Image Processing (IEEE, 2008), pp. 529-532.

Park et al., "Simultaneous Geometric and Radiometric Adaptation to Dynamic Surfaces With a Mobile Projector-Camera System", Trans. Circuits and Systems for Video Technology, Vol. 18, No. 1 (IEEE, Jan. 2008), pp. 110-115.

Park et al., "Content Adaptive Embedding of Complementary Patterns for Nonintrusive Direct-Projected Augmented Reality", Virtual Reality: Lecture Notes in Computer Science, vol. 4563/2007 (Springer-Verlag, Berlin, 2007), pp. 132-141.

Park et al., "Undistorted Projection onto Dynamic Surface", Advances in Image and Video Technology (2006), pp. 582-590.

Cotting et al., "Embedding Imperceptible Patterns into Projected Images for Simultaneous Acquisition and Display", Int'l Symposium on Mixed and Augmented Reality (IEEE, ACM, 2004), pp. 100-109.

Grundhofer et al., "Dynamic Adaptation of Projected Imperceptible Codes", Int'l Symposium on Mixed and Augmented Reality (IEEE, ACM, 2007), pp. 181-190.

Kalloniatis et al., "Temporal Resolution", Webvision: The Organization of the Retina and Visual System (Kolb et al., ed.), available at http://www.ncbi.nlm.nih.gov/books/NBK11559/ (Univ. Utah Health Sci. Center, 2007).

Lee et al., "Moveable Interactive Projected Displays Using Projector Based Tracking", Proc. 18th Annual ACM Symposium on User Interface Software and Technology (ACM, 2005), pp. 63-72.

Civolution, "Forensic Marking for Digital Cinema : NexGuard—Digital Cinema", product brochure (Civolution BV), 2010.

Watson et al., "Window of visibility: a psychophysical theory of fidelity in time-sampled visual motion displays", J. Opt. Soc. Am. A, vol. 3, No. 3 (Mar. 1986), pp. 300-307.

Watson et al., "What does the eye see best?", Nature 302(5907): 419-422 (1983).

* cited by examiner

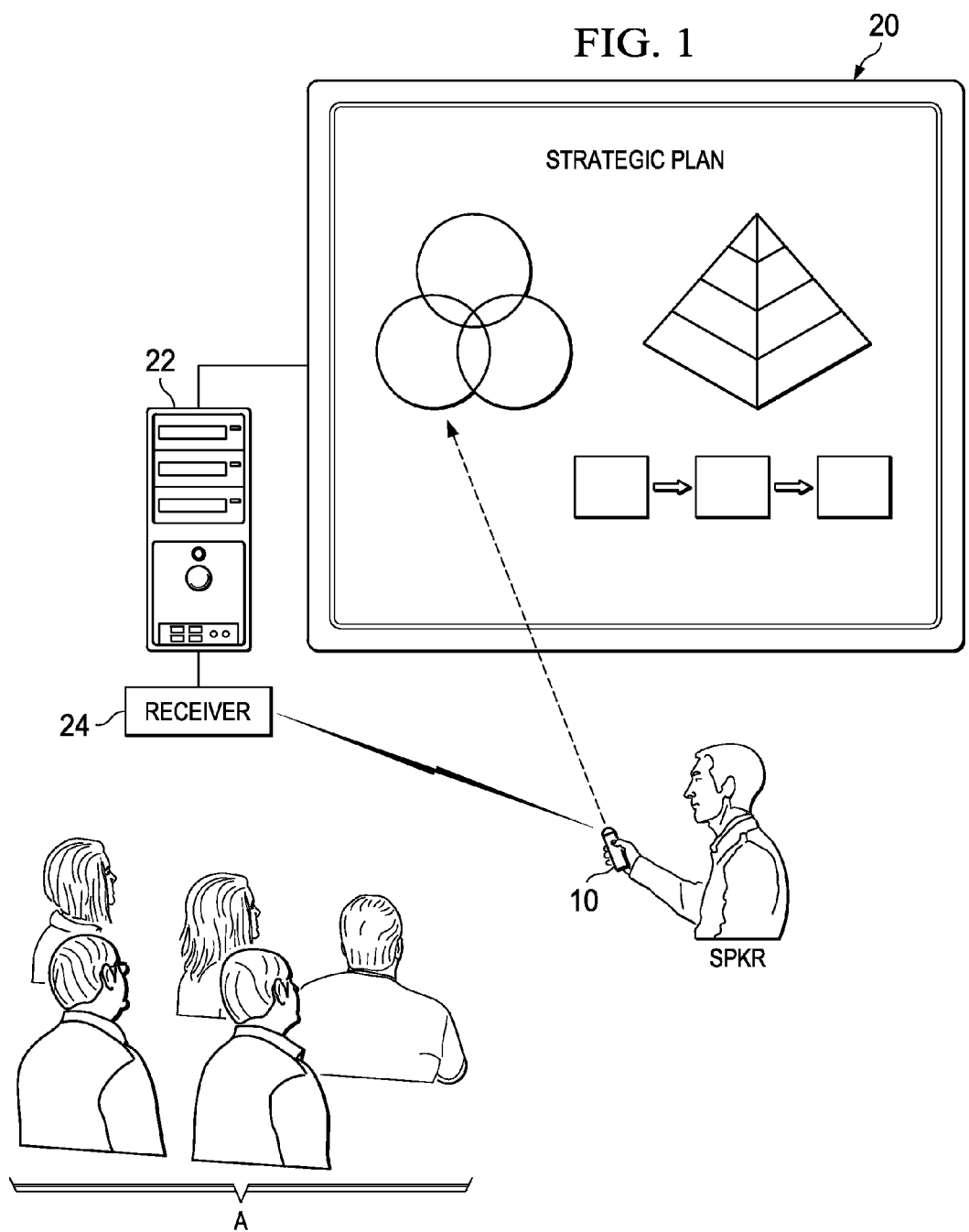

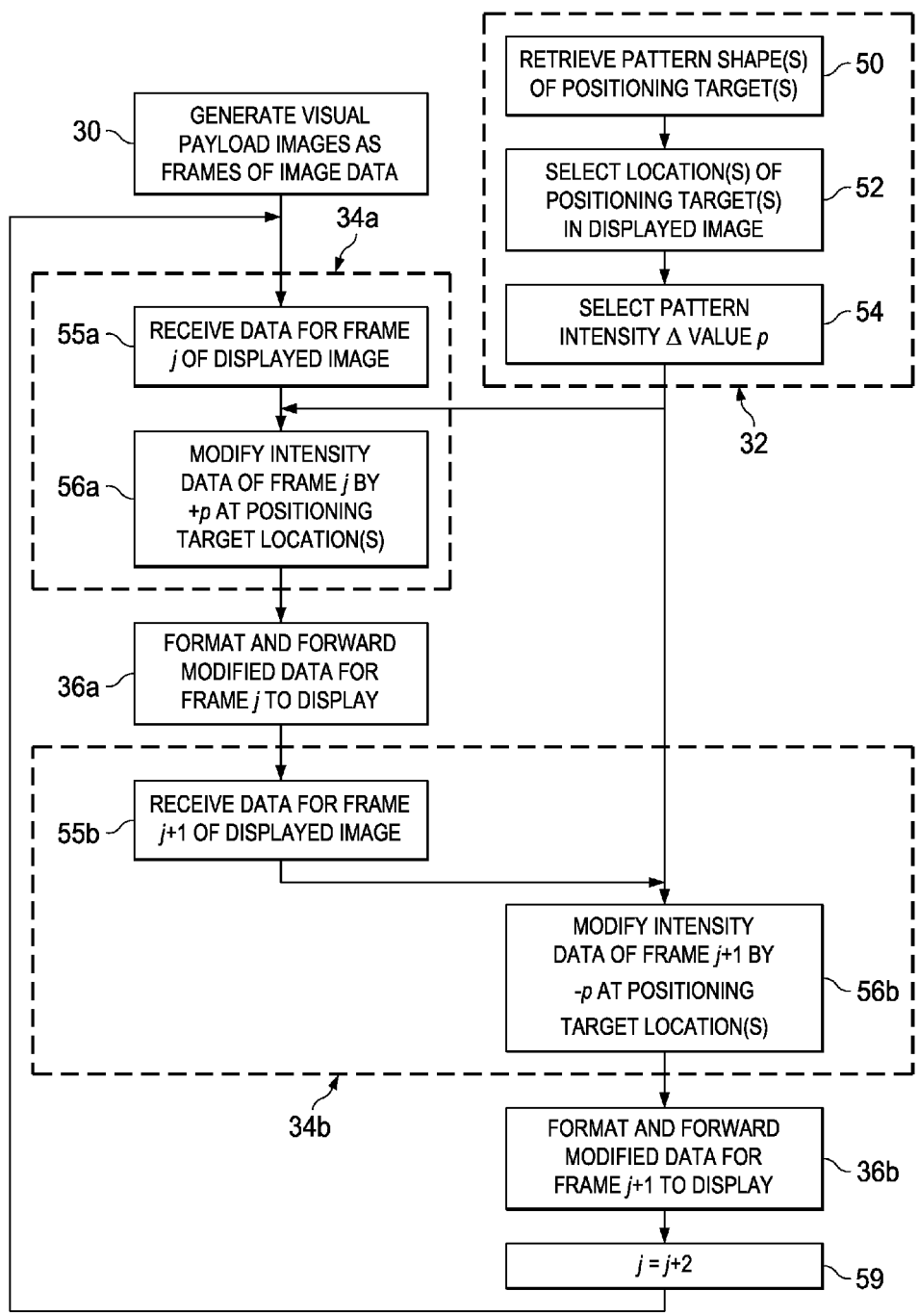

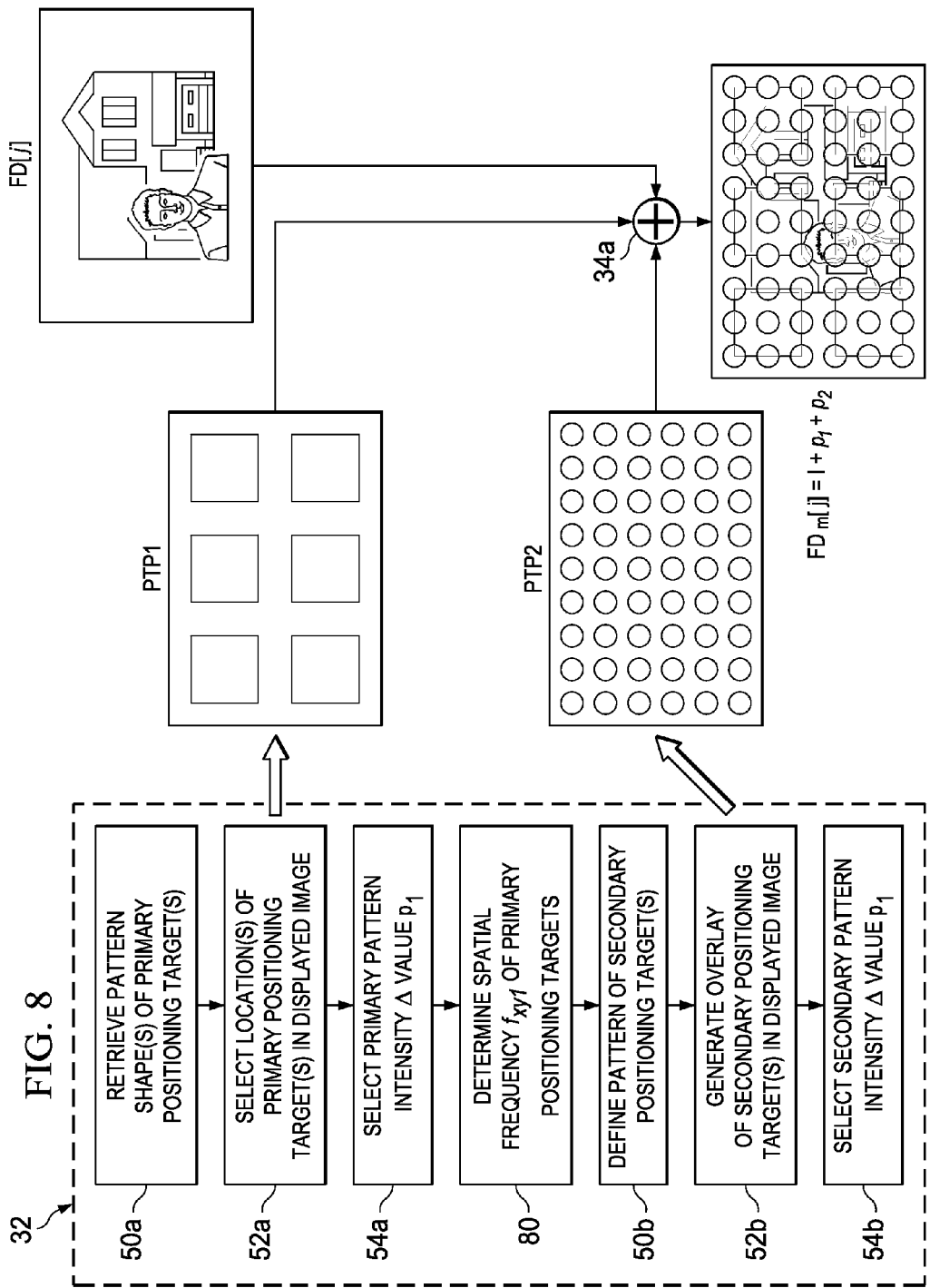

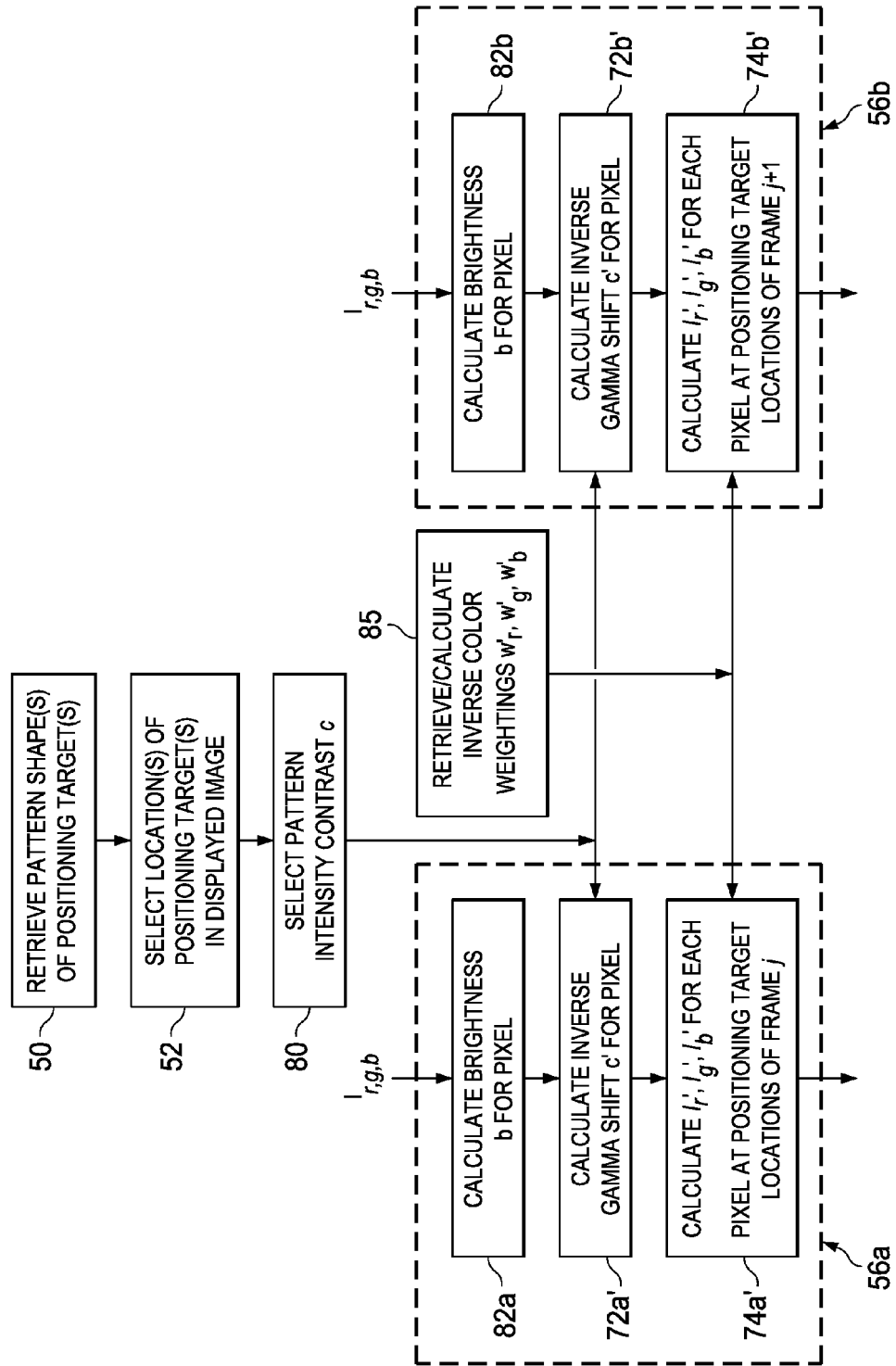

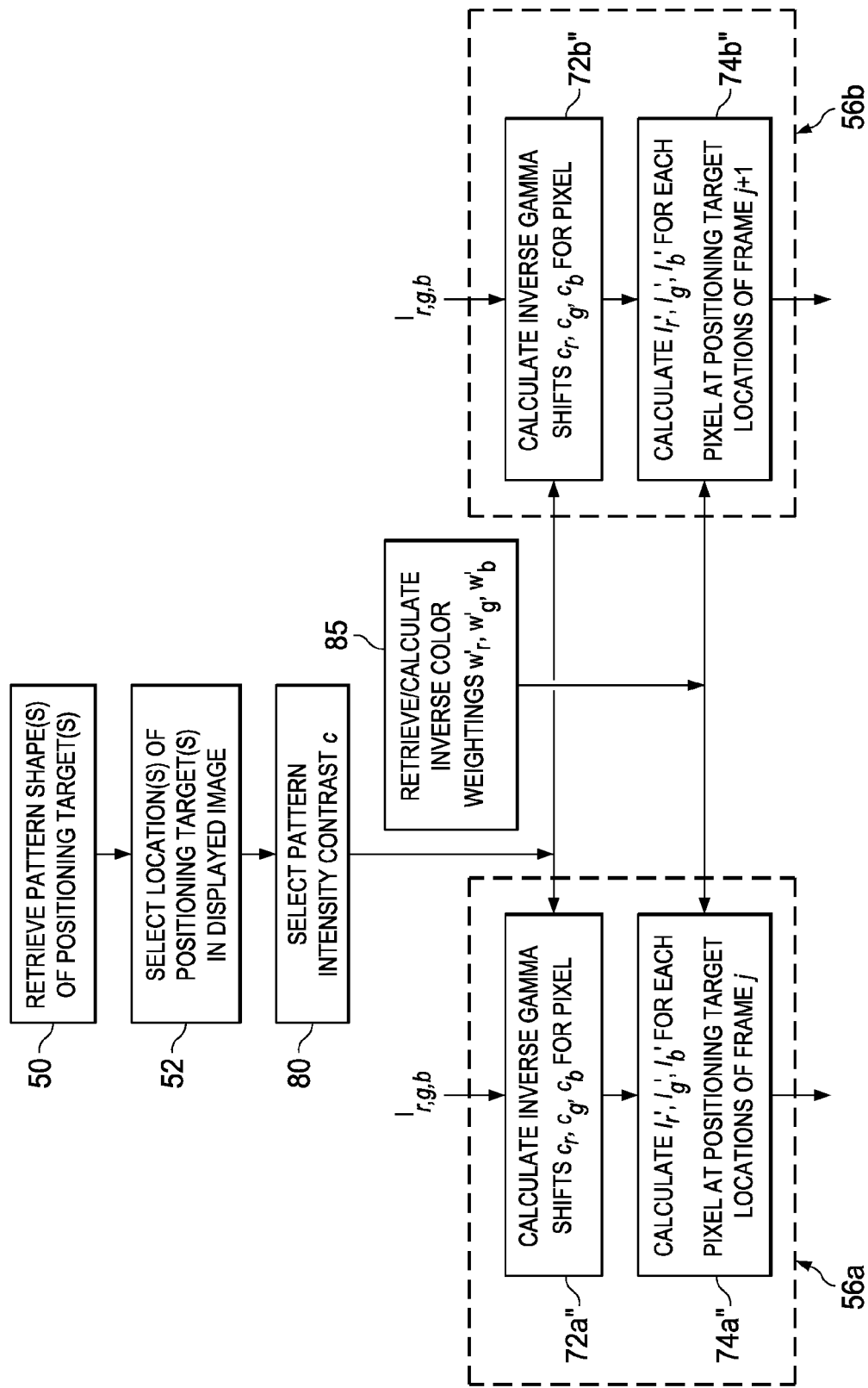

INTERACTIVE DISPLAY SYSTEM

CROSS-REFERENCE TO RELATED APPLICATIONS

This application claims priority, under 35 U.S.C. §119(e), of Provisional Application No. 61/314,437, filed Mar. 16, 2010, incorporated herein by this reference.

STATEMENT REGARDING FEDERALLY SPONSORED RESEARCH OR DEVELOPMENT

Not applicable.

BACKGROUND OF THE INVENTION

This invention is in the field of interactive display systems. Embodiments of this invention are more specifically directed to such display systems, and methods of operating the same, in which the user interacts with displayed content using a remote hand-held device.

The ability of a speaker to communicate a message to an audience is generally enhanced by the use of visual information, in combination with the spoken word. In the modern era, the use of computers and associated display systems to generate and display visual information to audiences has become commonplace, for example by way of applications such as the POWERPOINT presentation software program available from Microsoft Corporation. For large audiences, such as in an auditorium environment, the display system is generally a projection system (either front or rear projection). For smaller audiences such as in a conference room or classroom environment, flat-panel (e.g., liquid crystal) displays have become popular, especially as the cost of these displays has fallen over recent years. New display technologies, such as small projectors ("pico-projectors"), which do not require a special screen and thus are even more readily deployed, are now reaching the market. For presentations to very small audiences (e.g., one or two people), the graphics display of a laptop computer may suffice to present the visual information. In any case, the combination of increasing computer power and better and larger displays, all at less cost, has increased the use of computer-based presentation systems, in a wide array of contexts (e.g., business, educational, legal, entertainment).

A typical computer-based presentation involves the speaker standing remotely from the display system, so as not to block the audience's view of the visual information. Often, the speaker will use a pointer, such as a laser pointer or even a simple wooden or metal pointer, to non-interactively point to the visual information on the display. In this type of presentation, however, the speaker is essentially limited to the visual information contained within the presentation as generated, typically as displayed in a sequential manner (i.e., from one slide to the next, in a given order).

However, because the visual presentation is computer-generated and computer-controlled, an interactive presentation can be carried out. Such an interactive presentation involves selection of visual content of particular importance to a specific audience, annotation or illustration of the visual information by the speaker during the presentation, and invocation of effects such as zooming, selecting links to information elsewhere in the presentation (or online), moving display elements from one display location to another, and the like. This interactivity greatly enhances the presentation, making it more interesting and engaging to the audience.

In conventional display systems used before an audience, however, the speaker must generally be seated at the computer itself in order to interactively control the displayed presentation content by operating the computer. This limitation can detract from the presentation, especially in the large audience context.

The ability of a speaker to interact, from a distance, with displayed visual content, is therefore desirable. More specifically, a hand-held device that a remotely-positioned operator could use to point to, and interact with, the displayed visual information is therefore desirable. Of course, in order for such a device to function interactively, the computer-based display system must discern the location on the display that the device is pointing to, in order to comprehend the operator command.

As known in the art, conventional "light pens" provide hand-held interaction with a display at a distance. In these devices, the pointed-to position on a cathode-ray-tube display (CRT) is detected by sensing the time at which the pointed-to pixel location on the display is refreshed by the CRT electron gun. This sensed time is correlated with the raster-scanning sequence of the CRT display, to determine the screen location at which the light pen sensor is aimed. Of course, this light pen sensing technology is limited to CRT displays, because of its dependence on sensing the raster-scan timing.

U.S. Pat. No. 5,933,135 describes another conventional type of hand-held pointing device, which is useful in connection with modern liquid-crystal displays (LCDs) and other similar flat-panel display technologies (e.g., plasma displays, light-emitting diode (LED) displays, etc.). This pen device includes an imager, such as a camera, that captures an image of a portion of the display screen, including a visible cursor. The location, size, and orientation of the detected cursor is forwarded to a host processor, which compares the detected cursor with the displayed image, and deduces the relative orientation and position of the pen device relative to the display. According to this and similar approaches described in U.S. Pat. No. 7,513,700 and in U.S. Pat. No. 7,161,596, the pointing device captures some or all of the displayed image, not necessarily including a cursor element. Comparison between the captured image and the image being displayed enables deduction of the relative position of the center of the camera image in to the displayed image.

These conventional pointing devices necessarily constrain the displayed image, however, requiring either a displayed cursor element or perceptible image content varying within the displayed image in order to determine the pointed-to location of the positioning device. In some situations, the presence of a cursor may be distracting or superfluous to the viewing audience. In addition, these devices would be precluded from use in a "white board" context, for example if the user wished to hand-write or draw an image on an otherwise-blank display field. In addition, this approach involves a large amount of data processing and bandwidth to communicate and compare the captured image with the displayed image.

U.S. Pat. No. 7,420,540 describes a pointing device useful for a user that is relatively distant from the display, and that does not necessarily rely on the content of the displayed image for positioning. When actuated, this pointing device captures an image from a distance, including one or more corners of the display, and perhaps the center of the display, and forwards that captured image to a controller. The controller then determines the positioning and relative movement of the pointing device from the location and orientation of the display corners in the images captured by the pointing device. However, this approach is limited to those situations in which the user is sufficiently distant from the display that the field of view of the pointing device includes one or more display corners, and would appear not to operate well in smaller environments or in those situations in which the speaker is near a large display.

According to another approach, the displayed image includes positioning information that is perceptible to a pointing device, but not directly perceptible to a human viewer. U.S. Pat. No. 7,553,229 describes a gaming display system in which crosshair navigation frames are interleaved among the sequence of displayed image frames. These crosshair navigation frames are described as including a relatively dark image pattern that, because of the relatively few number of navigation frames interleaved within the frame image sequence at a relatively high frame rate, would not be directly perceptible to the human viewer. In this system, the gaming device (i.e., pointing device) captures a video sequence including two or more of the navigation frames; the system then identifies the navigation frames by pattern recognition, and cross-correlates the identified frames to determine a "cross-hair" position of the display at which the pointing device is aimed. Rapid positioning of the device in this system requires a high duty cycle of navigation frames within the displayed sequence, which reduces the brightness and contrast of the displayed gaming images to the human user; conversely, less human-perceptible impact can be attained at a cost of longer positioning detection times and thus reduced game performance.

Other positioning approaches involving human imperceptible image information for location of a pointing device are described in U.S. Pat. No. 7,421,111. According to one described approach, a sequence of positioning pattern frames are encoded by pixel or location, displayed, and sensed over time; the pointed-to location is then deduced from the sensed sequential code. Human perceptibility of these positioning patterns is reduced by use of infrared light for the patterns, or by using an extremely high frame rate for display of visible-light positioning patterns within the overall displayed images (requiring either a high-speed projection technology, or a separate projector). In another approach described in this patent, multiple sensors are provided within the pointing device to enlarge the sensed area of the display, and capture a complete code within a single frame; this approach appears to limit the distance between the positioning device and the displayed image, in order for proper decoding and positioning.

By way of further background, an "augmented reality system" is described in Park et al., "Undistorted Projection onto Dynamic Surface", *Advances in Image and Video Technology* (2006), pp. 582-90. In this described system, images are projected onto actual real-world objects and surfaces to enhance the viewer's perception of his or her environment, with geometric correction applied to the displayed image to account for variations in the surface of the object from flat. This geometric correction is described as based on a comparison of camera-captured image data with the image data to be displayed. In this article, the projection system overlays the displayed image with pattern image variations in brightness or color in successive frames. The pattern images in successive frames (i.e., the variations) sum to zero, and are thus imperceptible to the human viewer. The camera-captured images in successive frames are subtracted from one another for purposes of geometric correction, canceling the displayed image data but recovering the pattern image. Comparison of the recovered pattern image as viewed by the camera with the data to be displayed enables geometric correction of the displayed images.

By way of further background, interactive projector systems of the digital micromirror device type are known. In these systems, a separate high-speed modulated light source, or alternatively an color wheel segment, is used to project positioning information at the display that are invisible to human viewers but detectable to an camera. These systems are of course limited to digital micromirror-based modulator projection display systems, and typically require additional projection subsystems (including an additional modulator) to operate with reasonable performance.

BRIEF SUMMARY OF THE INVENTION

Embodiments of this invention provide an interactive display system and a method of interactively operating a display system in which a hand-held pointing device interacts with displayed content over a wide range of distances and orientations.

Embodiments of this invention provide such a system and method in which the location at which the pointing device is aimed is determined in a manner that is imperceptible to the audience, regardless of the content of the human-perceptible image.

Embodiments of this invention provide such a system and method in which positioning of the pointing device can be performed rapidly and efficiently, using human-imperceptible positioning information displayed using visible light and at the nominal frame rate of the display.

Embodiments of this invention provide such a system and method in which the types of user interaction via the pointing device include highlighting, click-and-drag, free-hand text and drawing, operation of the underlying computer system driving the display, zoom of the displayed image, hand gesture recognition, and the like.

Embodiments of this invention provide such a system and method in which positioning of the location at which the pointing device is aimed is performed efficiently and rapidly.

Embodiments of this invention provide such a system and method in which the positioning process can be assisted by other sensors included in the pointing device, such as accelerometers and other physical positioning and movement sensors.

Embodiments of this invention provide such a system and method that is compatible with a wide range of display types, including CRT, flat-panel, and projection displays (of either the front or rear type).

Embodiments of this invention provide such a system and method that is compatible with existing display systems, without requiring retrofit or replacement.

Embodiments of this invention provide such a system and method in which the pointing device can be used over a wide range of display sizes, ranging from auditorium-size projection screens to laptop flat-panel displays.

Embodiments of this invention provide such a system and method that is compatible with touch detection and touch screen interaction.

Embodiments of this invention provide such a system and method in which the computational resources may be distributed over the system as desired.

Other objects and advantages of embodiments of this invention will be apparent to those of ordinary skill in the art having reference to the following specification together with its drawings.

One aspect of the invention may be implemented into a computer display system, including a remote wireless or wired pointing device including a camera or other video capture system. The pointing device includes a camera, and the ability to communicate with the computer system that generates the displayed image. According to embodiments of the invention, the computer system displays its intended visual (graphics or video) output on a conventional display, such as a flat-panel display or a projection system and screen. One or more positioning targets are included within this intended visual output, in the form of a patterned modulation of the intensity (e.g., variation in pixel brightness, or intensity, of one or more of the displayed colors) in a display frame of the visual payload, followed by the opposite modulation in a successive frame. The human audience naturally averages the viewed frames, which has the effect of canceling out the modulation of the positioning targets over time, while leaving the intended visual output visible to the audience. All or part of at least two frames of the displayed image including one or more of the positioning targets is captured by the pointing device; the captured frame data in successive frames are subtracted from one another to recover the positioning target in the captured visual data (and to remove the displayed image payload). The location, size, and orientation of the recovered positioning target identify the aiming point and the spatial position of the pointing device relative to the display.

According to another aspect of the invention, the display system includes a positioning target at varying locations at varying times in the display. In one example, the positioning target is displayed on demand (e.g., upon the user actuating a switch in the positioning device), and captured by the positioning device. The display system then includes a second target in a later frame of the displayed image, at a different location of the display. The location, size, timing, and orientation of the displayed positioning targets in the captured images are processed to recover the aiming point of the pointing device relative to the display. The process can be repeated over time, to comprehend movement of the pointing device.

According to another aspect of the invention, the display system generates later positioning targets at locations, sizes, and other attributes that are selected in response to the image of the positioning target captured from previous frames. Accurate and rapid determination of the pointed-to location of the display is facilitated by the pointing device capturing a portion of the displayed image in which the positioning target is prominent, and closely matches the generated positioning target. According to this aspect of the invention, the positioning target is altered to correct for distance of the pointing device from the display, rotation of the pointing device, location of the pointing device "off-axis" from the display, and other distortions between the positioning target as generated and as captured by the pointing device.

Other aspects of the invention, as realized in its various embodiments, will become apparent to those skilled in the art having reference to this specification,

BRIEF DESCRIPTION OF THE SEVERAL VIEWS OF THE DRAWING

FIG. 1 is a schematic perspective view of a speaker presentation being carried out using an interactive display system according to embodiments of the invention.

FIG. 4a is a flow diagram of a method of displaying an image including one or more positioning targets, according to embodiments of the invention.

FIG. 4b is a flow diagram illustrating an example of the operation of the method of FIG. 4a.

FIG. 8 is a flow diagram and corresponding example of an alternative embodiment of the invention in which the regularity of positioning targets is disrupted.

FIGS. 10a and 10b are flow diagrams illustrating an alternative embodiment of the invention in which positioning targets are color-weighted to reduce human perceptibility.

DETAILED DESCRIPTION OF THE INVENTION

Figure 2A:
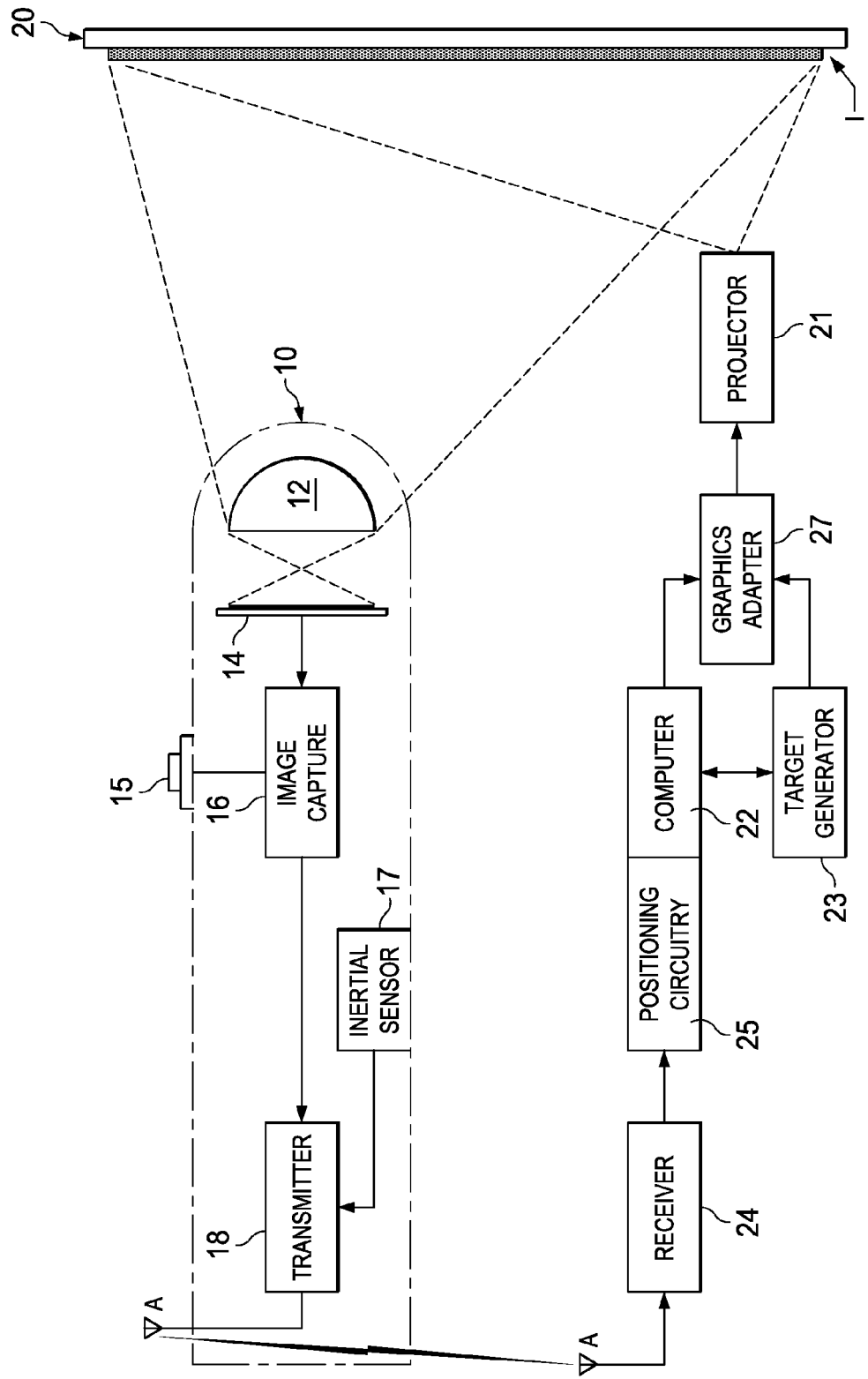
FIGS. 2a and 2b are electrical diagrams, in block form, each illustrating an interactive display system according to an embodiment of the invention.

The present invention will be described in connection with one or more of its embodiments, namely as implemented into a computerized presentation system including a display visible by an audience, as it is contemplated that this invention will be particularly beneficial when applied to such a system. However, it is also contemplated that this invention can be useful in connection with other applications, such as in gaming systems, general input by a user into a computer system, and the like. Accordingly, it is to be understood that the following description is provided by way of example only, and is not intended to limit the true scope of this invention as claimed.

FIG. 1 illustrates a simplified example of an environment in which embodiments of this invention are useful. As shown in FIG. 1, speaker SPKR is giving a live presentation to audience A, with the use of visual aids. In this case, the visual aids are in the form of computer graphics and text, generated by computer 22 and displayed on room-size graphics display 20, in a manner visible to audience A. As known in the art, such presentations are common in the business, educational, entertainment, and other contexts, with the particular audience size and system elements varying widely. The simplified example of FIG. 1 illustrates a business environment in which audience A includes several or more members viewing the presentation; of course, the size of the environment may vary from an auditorium, seating hundreds of audience members, to a single desk or table in which audience A consists of a single person.

The types of display 20 used for presenting the visual aids to audience A can also vary, often depending on the size of the presentation environment. In rooms ranging from conference rooms to large-scale auditoriums, display 20 may be a projection display, including a projector disposed either in front of or behind a display screen. In that environment, computer 22 would generate the visual aid image data and forward it to the projector. In smaller environments, display 20 may be an external flat-panel display, such as of the plasma or liquid crystal (LCD) type, directly driven by a graphics adapter in computer 22. For presentations to one or two audience members, computer 22 in the form of a laptop or desktop computer may simply use its own display 20 to present the visual information. Also for smaller audiences A, hand-held projectors (e.g., "pocket projectors" or "pico projectors") are becoming more common, in which case the display screen may be a wall or white board.

The use of computer presentation software to generate and present graphics and text in the context of a presentation is now commonplace. A well-known example of such presentation software is the POWERPOINT software program available from Microsoft Corporation. In the environment of FIG. 1, such presentation software will be executed by computer 22, with each slide in the presentation displayed on display 20 as shown in this example. Of course, the particular visual information need not be a previously created presentation executing at computer 22, but instead may be a web page accessed via computer 22; a desktop display including icons, program windows, and action buttons; video or movie content from a DVD or other storage device being read by computer 22; or even a blank screen as a "white board" (on which speaker SPKR may "draw" or "write" using pointing device 10). Other types of visual information useful in connection with embodiments of this invention will be apparent to those skilled in the art having reference to this specification.

As shown in FIG. 1, it is often useful for speaker SPKR to stand away from display 20, so as not to block the view of audience A and also to better engage audience A. According to embodiments of this invention, speaker SPKR is provided with the ability to interact with the visual content displayed at display 20, remotely from computer 22 and from display 20. Also according to embodiments of this invention, speaker SPKR can closely approach display 20, and virtually "press" or "touch" display 20, for example at a virtual button or link, to interact with the visual content in this manner. This interactive use of visual information displayed by display 20 provides speaker SPKR with the ability to extemporize the presentation as deemed useful with a particular audience A, to interface with active content (e.g., Internet links, active icons, virtual buttons, streaming video, and the like), and to actuate advanced graphics and control of the presentation, without requiring speaker SPKR to be seated at or otherwise "pinned" to computer 22.

As will be described in further detail below in connection with particular embodiments of the invention, speaker SPKR carries out this remote interaction by way of pointing device 10, which is capable of capturing all or part of the image at display 20 and of interacting with a pointed-to (or aimed-at) target location of that image. Pointing device 10 in this example wirelessly communicates this pointed-to location of display 20 and other user commands from speaker SPKR, to receiver 24 and thus to computer 22. In this manner, according to embodiments of this invention, remote interactivity with the displayed images is carried out.

General Construction and Operation of the Interactive Display System

Referring now to FIG. 2a, a generalized example of the construction of an interactive display system useful in an environment such as that shown in FIG. 1, and according to embodiments of this invention, will now be described. As shown in FIG. 2a, this interactive display system includes pointing device 10, projector 21, and display screen 20. In this embodiment of the invention, computer 22 includes the appropriate functionality for generating the "payload" images to be displayed at display screen 20 by projector 21, such payload images intended for viewing by the audience. The content of these payload images is interactively controlled by a human user via pointing device 10, according to embodiments of this invention. To do so, computer 22 cooperates with positioning circuitry 25, which determines the position of display screen 20 to which pointing device 10 is pointing. As will become apparent from the following description, this positioning determination is based on pointing device 10 detecting one or more positioning targets displayed at display screen 20.

In its payload image generation function, computer 22 will generate or have access to the visual information to be displayed (i.e., the visual "payload" images), for example in the form of a previously generated presentation file stored in memory, or in the form of active content such as computer 22 may retrieve over a network or the Internet. As will also be described in further detail below, this human-visible payload image frame data from computer 22 will be combined with positioning target image content generated by target generator function 23 that, when displayed at graphics display 20, can be captured by pointing device 10 and used by positioning circuitry 25 to deduce the location pointed to by pointing device 10. Graphics adapter 27 includes the appropriate functionality suitable for presenting a sequence of frames of image data, including the combination of the payload image data and the positioning target image content, in the suitable display format, to projector 21. Projector 21 in turn projects the corresponding images I at display screen 20, in this projection example.

The particular construction of computer 22, positioning circuitry 25, target generator circuitry 23, and graphics adapter 27 can vary widely. For example, it is contemplated that a single personal computer or workstation (in desktop, laptop, or other suitable form), including the appropriate processing circuitry (CPU, or microprocessor) and memory, can be constructed and programmed to perform the functions of generating the payload images, generating the positioning target, combining the two prior to or by way of graphics adapter 27, as well as receiving and processing data from pointing device 10 to determine the pointed-to location of the displayed image. Alternatively, it is contemplated that separate functional systems external to computer 22 may carry out one or more of the functions of target generator 23, receiver 24, and positioning circuitry 25, such that computer 22 can be realized as a conventional computer operating without modification; in this event, graphics adapter 27 could itself constitute an external function (or be combined with one or more of the other functions of target generator 23, receiver 24, and positioning circuitry 25, external to computer 22), or alternatively be realized within computer 22, to which output from target generator 23 is presented. Other various alternative implementations of these functions are also contemplated. In any event, it is contemplated that computer 22, positioning circuitry 25, target generator 23, and other functions involved in the generation of the images and positioning targets displayed at graphics display 20, will include the appropriate program memory in the form of computer-readable media storing computer program instructions that, when executed by its processing circuitry, will carry out the various functions and operations of embodiments of the invention as described in this specification. It is contemplated that those skilled in the art having reference to this specification will be readily able to arrange the appropriate computer hardware and corresponding computer programs for implementation of these embodiments of the invention, without undue experimentation.

Pointing device 10 in this example includes a camera function consisting of optical system 12 and image sensor 14. With pointing device 10 aimed at display 20, image sensor 14 is exposed with the captured image, which corresponds to all or part of image I at display 20, depending on the distance between pointing device 10 and display 20, the focal length of lenses within optical system 12, and the like. Image capture function 16 includes the appropriate circuitry known in the art for acquiring and storing a digital representation of the captured image at a particular point in time selected by the user, or as captured at each of a sequence of sample times. Pointing device 10 also includes actuator 15, which is a conventional push-button or other switch by way of which the user of pointing device 10 can provide user input in the nature of a mouse button, to actuate an image capture, or for other functions as will be described below and as will be apparent to those skilled in the art. In this example, one or more inertial sensors 17 are also included within pointing device 10, to assist or enhance user interaction with the displayed content; examples of such inertial sensors include accelerometers, magnetic sensors (i.e., for sensing orientation relative to the earth's magnetic field), gyroscopes, and other inertial sensors.

In this example of FIG. 2a, pointing device 10 is operable to forward, to positioning circuitry 25, signals that correspond to the captured image acquired by image capture function 16. This communications function is performed by wireless transmitter 18 in pointing device 10, along with its internal antenna A, by way of which radio frequency signals (e.g., according to a conventional standard such as Bluetooth or the appropriate IEEE 802.11 standard) are transmitted. Transmitter 18 is contemplated to be of conventional construction and operation for encoding, modulating, and transmitting the captured image data, along with other user input and control signals via the applicable wireless protocol. In this example, receiver 24 is capable of receiving the transmitted signals from pointing device 10 via its antenna A, and of demodulating, decoding, filtering, and otherwise processing the received signals into a baseband form suitable for processing by positioning circuitry 25.

Figure 3A:
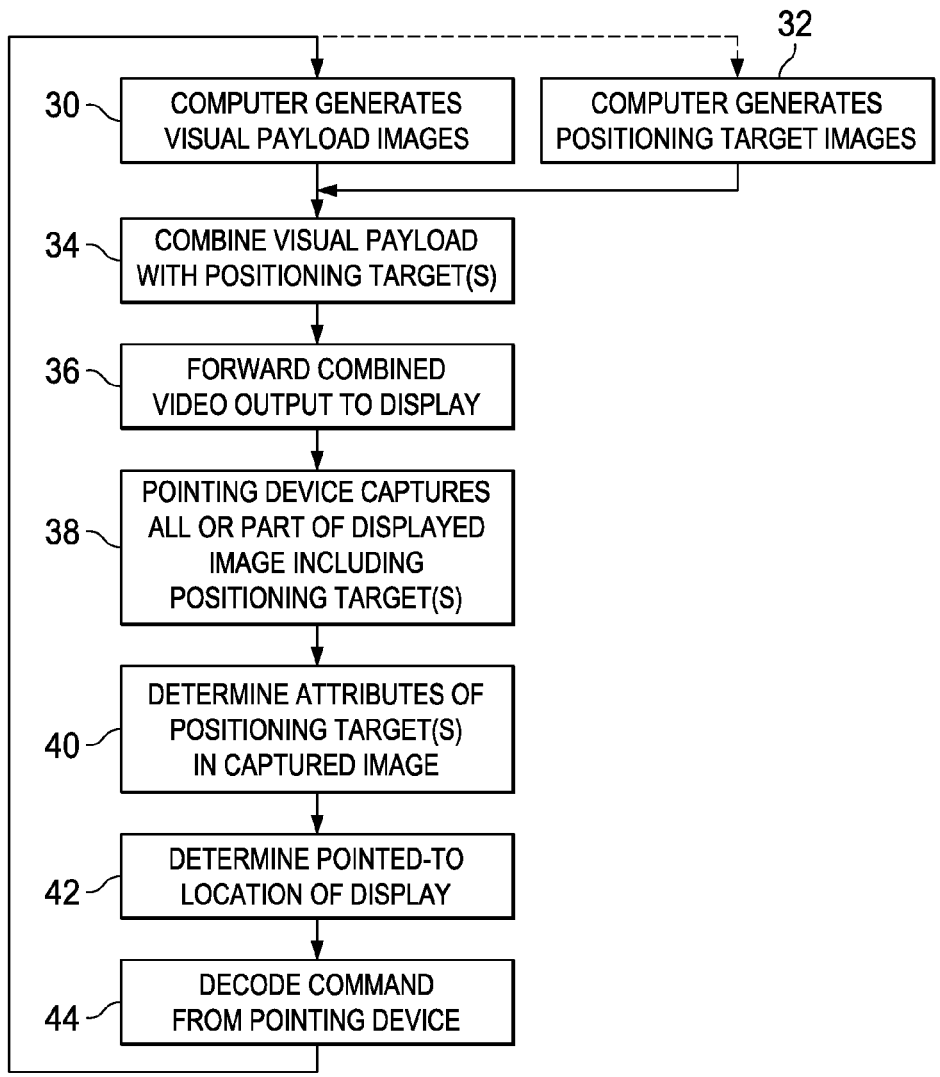
FIG. 3a is a flow diagram illustrating the operation of an interactive display system, according to embodiments of the invention.

The operation of the interactive display system according to embodiments of the invention will now be described, in a general sense, with reference to FIG. 3a. In process 30, computer 22 generates visual payload image data to be displayed at display 20. These visual payload image data correspond to the human-perceptible content intended for viewing by audience A in the environment of FIG. 1, such content corresponding to the visual aids (POWERPOINT slides, web pages, etc.) constituting the visual component of the presentation. Along with this visual payload image data, in process 32, target generator function 23 generates positioning target images that will also be displayed on display 20 along with the visual payload image data. The nature of these positioning target images, according to embodiments of this invention, will be described in further detail below. In embodiments of this invention, the positioning target images generated in process 32 need not be directly perceptible by audience A, but need only be perceptible by pointing device 10 for operation of this system. In process 34, graphics adapter 27 combines the visual payload image data and the positioning target image data into a form suitable for display at display 20, for example in the form of one or more "frames" of graphics or video data in the conventional sense. Alternatively, computer 22 may receive the positioning targets from target generator function 23 and combine those positioning targets with the payload image data prior to forwarding the combined result to graphics adapter 27; in this case, one or both of computer 22 and target generator function 23 may include graphics adapter circuitry, with either of those instances or alternatively downstream graphics adapter circuitry serving as graphics adapter 27 that presents the graphics output to projector 21. However combined, in process 36, those combined frames are forwarded to projector 21 for output at display 20 in the conventional manner. Alternatively, for other types of display systems (such as LCD, LED, and other non-projection displays), no projector 21 will be utilized but rather graphics display 20 itself will include the appropriate functionality for receiving and displaying the combined payload images and positioning targets.

Figure 3B:
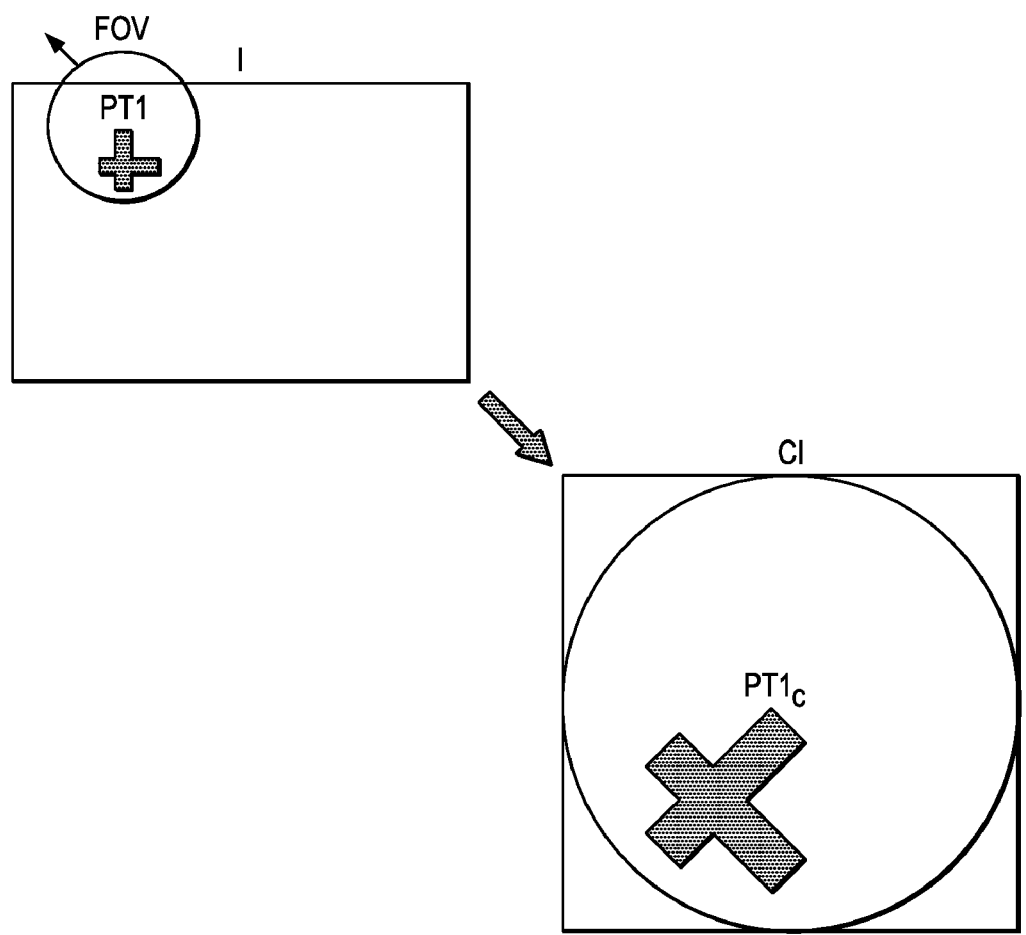
FIG. 3b is an illustration of a positioning target as included in an image displayed by the interactive display system of embodiments of the invention.

FIG. 3b illustrates a generalized example of image I as displayed on display 20 following process 36. As shown in this FIG. 3b, image I includes a rudimentary positioning target PT1, placed in the upper left-hand quadrant of image I as displayed at display 20. It is useful for positioning target PT1 to include some asymmetry, so that rotation of pointing device 10 relative to the axes of display 20 can be identified from analysis of the captured image by positioning circuitry 25. It is contemplated that an auxiliary motion sensor, such as an accelerometer, implemented within pointing device 10, can assist in this rotational orientation determination, enabling positioning to be performed more rapidly.

The interactive display operation continues with pointing device 10 capturing at least part of the image being displayed at display 20, in process 38. As mentioned above, pointing device 10 may capture this image on user command, for example by way of actuator 15; alternatively, pointing device 10 may periodically capture images in the form of a sequence of sampled images. In either case, to accomplish interactive operation of the system, the image or images captured by pointing device 10 will include one or more of the positioning targets in the displayed image, along with the human-perceptible visual payload images. FIG. 3b illustrates an example of captured image CI, for the case in which pointing device 10 is aimed at displayed image I as indicated by field of view FOV. As shown in FIG. 3b, field of view FOV at which captured image CI is acquired includes only a portion of displayed image I; in addition, field of view FOV is rotated (e.g., 45° counter-clockwise) from the orientation of displayed image I. Captured image CI includes captured positioning target $PT1_C$, in this example.

Upon pointing device 10 acquiring at least one image including at least one positioning target, positioning circuitry in the interactive display system determines attributes of the positioning target image contained within the captured image, in process 40. These attributes include the location of the positioning target in the captured image, as viewed by pointing device 10, and may also include such attributes as the size of the positioning target in that captured image (this size indicating the distance of pointing device 10 from display 20), the orientation of the positioning target in the captured image (which indicates the orientation of pointing device 10 relative to the display), the shape of the positioning target in the captured image (which can indicate the position of pointing device 10 off the axis normal to display 20), and the like. Referring to the rudimentary example of FIG. 3b, the position of captured positioning target $PT1_C$ can be identified as in the lower left-hand sector of captured image CI (e.g., by way of certain coordinates). The relative size of captured positioning target $PT1_C$ can be identified, to give an indication of how close pointing device 10 is to display 20 at the time of capture; in addition, the orientation of captured positioning target $PT1_C$ can be identified from asymmetry in its shape as captured.

Based on these identified attributes, positioning circuitry 25 in the system of FIG. 2a determines the location of displayed image I at which pointing device 10 is pointed, at the time of the image capture, in process 42. In a general sense, this determination of process 42 is accomplished by comparing captured image CI against the video data forming image I at the corresponding time. This comparison may be carried out as a direct comparison of video data (i.e., comparing a bit map of captured image CI with the bit map of displayed image I to place field of view FOV at the correct place within image I). Alternatively, the identified attributes such as size, orientation, shape, and the like may also be compared against similar attributes of the positioning target as displayed, from which the relative position of pointing device 10 to display 20 can be calculated. It is contemplated that those skilled in the art having reference to this specification can readily develop the appropriate algorithms and methods for determining the pointed-to location, given captured image CI and displayed image I, without undue experimentation.

In any case, upon determination of the location of display 20 at which pointing device 10 is aimed, at the time of image capture, computer 22 can then decode a command given by the user via pointing device 10, in the graphical user interface manner. As fundamental in the art, graphical user interface commands include such functions as "select", click-and-drag, double-click, right-click, and the like, as well as other commands including zooming in or out of the displayed content, page turning, and the like. Other examples of such commands including drawing of free-hand images, or the writing of free-hand text, through use of pointing device 10, either on displayed content (for example to highlight or comment on that content), or on a blank "white board" display. In the graphical user interface context, these commands include not only the particular action to be taken, but also depend on a currently pointed-to location in the displayed image. Upon decoding of the user command in this manner, the interactive display system repeats the process, for example by generating new visual payload image content to be displayed in response to the received user command, in process 30. Optionally, positioning targets may be generated and combined into the displayed image in a next instance of process 32, but also in response to the decoded command; for example, the location of the next positioning targets may depend on the current pointed-to location of the display (e.g., to ensure that the next positioning target is in view of pointing device 10). The process then repeats.

It is contemplated that the particular location of positioning circuitry 25 in the interactive display system of embodiments of this invention may vary from system to system. It is not particularly important, in the general sense, which hardware subsystem (i.e., the computer driving the display, the pointing device, a separate subsystem in the video data path, or some combination thereof) performs the determination of the pointed-to location of display 20. In the example shown in FIG. 2a, as described above, positioning circuitry 25 is deployed in combination with computer 22 and target generator function 23, in a system that combines the functions of generating the displayed images I and of determining the location of the displayed images I at which pointing device 10 is aimed (and decoding the commands associated therewith) into the same element of the system.

Figure 3C:
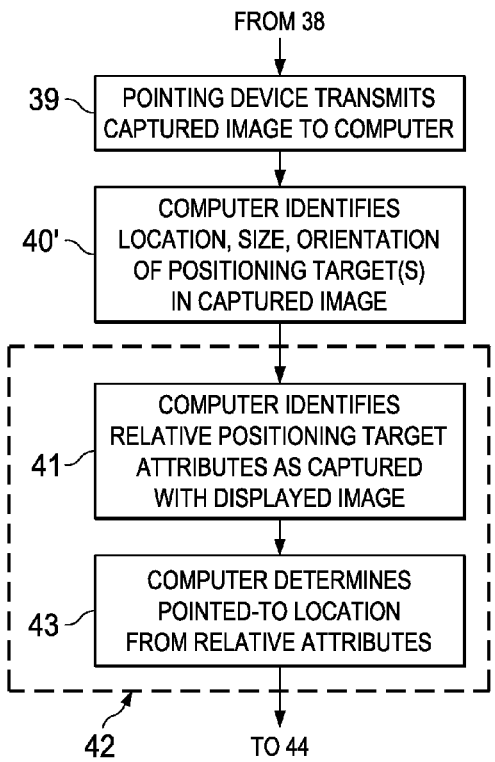
FIG. 3c is a flow diagram illustrating the operation of the interactive display system of FIG. 2a, according to that embodiment of the invention.

In this regard, FIG. 3c illustrates a portion of the overall process described above relative to FIG. 3a, but with more specific application to the system of FIG. 2a. In this case, the interactive display operation of FIG. 3c proceeds as described above relative to FIG. 3a, through process 38 in which pointing device 10 captures at least part of image I displayed at display 20. In process 39 (FIG. 3c), pointing device 10 transmits signals corresponding to captured image CI and including one or more positioning targets, to positioning circuitry 25 via transmitter 18 and antenna A. Upon receipt of that captured image data by receiver 24, positioning circuitry 25 executes process 40', in which it identifies one or more positioning targets within captured image CI data. In addition to identifying the location of those positioning targets, positioning circuitry 25 may also identify such other attributes of the positioning targets as size, orientation, and the like.

Determination of the pointed-to location (process 42 of FIG. 3a) is performed by positioning circuitry 25, in the system of FIG. 2a, by way of process 41, in which the attributes of the positioning target image content in captured image CI are compared with the corresponding positioning target image content in displayed image I. As described above, process 41 may be performed by direct comparison of the video image content, or alternatively by way of calculations based on particular attributes (comparison of x-y location in an image field, etc.), depending on the particular implementation. The relative positioning of pointing device 10 to display 20 identified in process 41 is then used by computer 22 to determine the pointed-to location of display 20, in process 43. The interactive display process then continues with process 44, as described above, by way of which computer 22 decodes and executes the current user command.

Figure 2B:
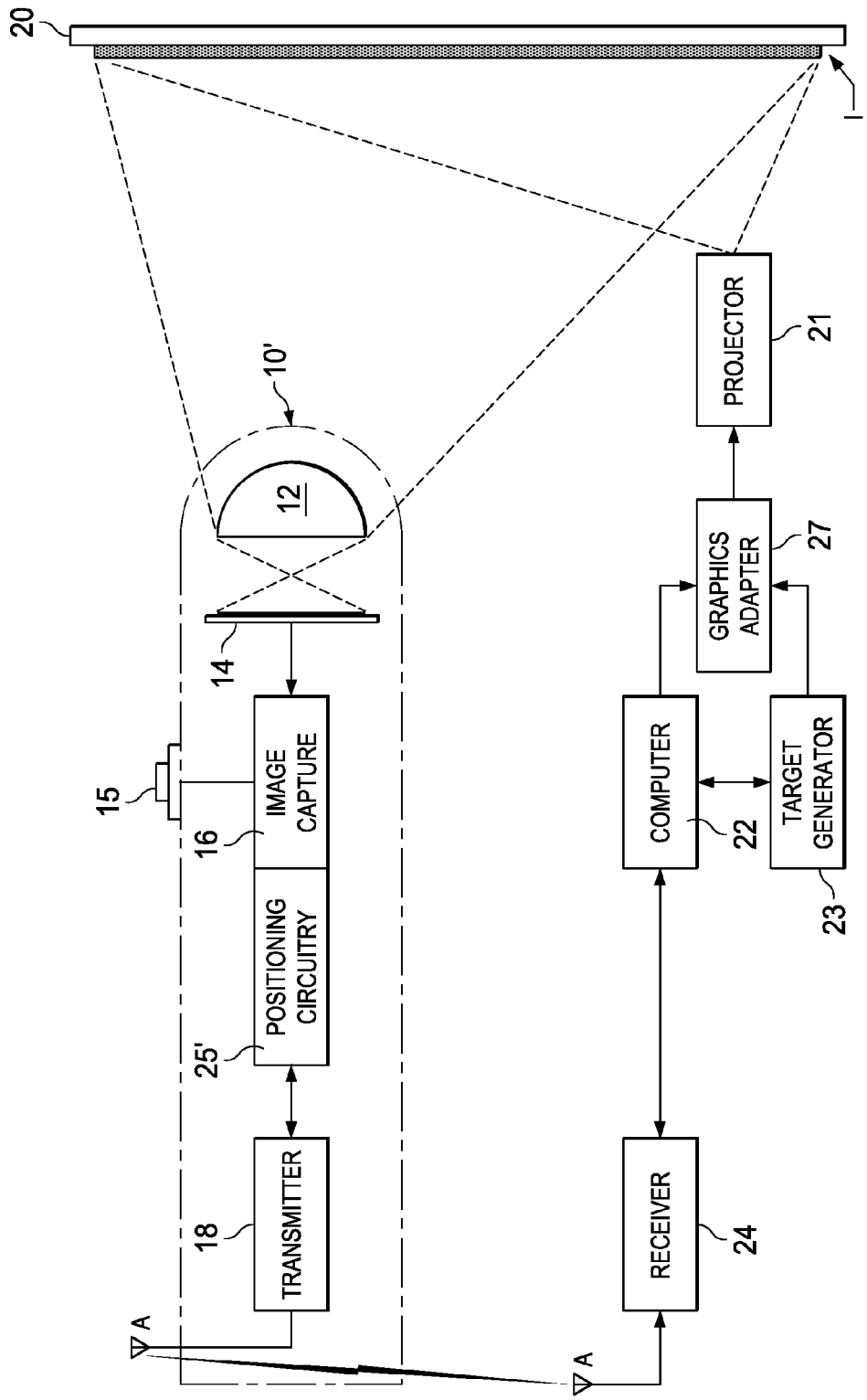

FIG. 2b illustrates an alternative generalized arrangement of an interactive display system according to embodiments of this invention. This system includes projector 21 and display 20 as before, with projector 21 projecting payload image content and positioning target image content generated by computer 22 as described above. In this example, pointing device 10' performs some or all of the computations involved in determining the location of display 20 at which it is currently pointing. As such, in addition to a camera (lens 12, image sensor 14, and image capture 16), positioning device 10' includes positioning circuitry 25', along with wireless transmitter 18. Conversely, computer 22 is coupled to receiver 24, as before.

Figure 3D:
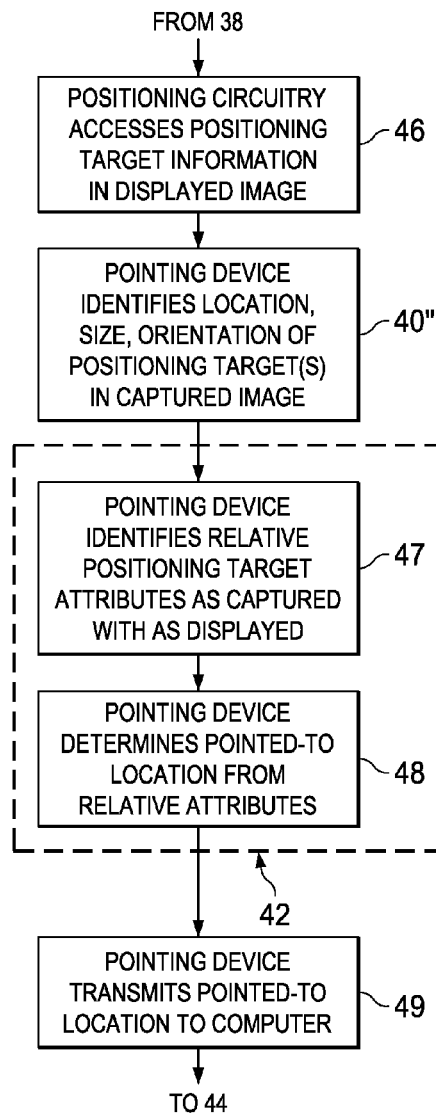
FIG. 3d is a flow diagram illustrating the operation of the interactive display system of FIG. 2b, according to that embodiment of the invention.

In a general sense, positioning circuitry 25' then determines the location of display 20 at which it is aimed, by comparing positioning target image content contained within captured image I acquired at its image sensor 14 and image capture 16, with positioning target image information stored in its memory. For example, positioning circuitry 25' may, a priori, store image data corresponding to the nominal shape and size of the positioning target to be displayed at display 20, so that it can compare captured images with that positioning target image. Alternatively, transmitter 18 and receiver 24 may be each be implemented as transceivers, capable of both receiving and transmitting wireless communications with one another, in which case data corresponding to the size, shape, and position of the positioning targets as displayed at display 20 can be transmitted to pointing device 10' for comparison. In either case, the system of FIG. 2b, with the distribution of at least a portion of positioning circuitry 25' at pointing device 10', results in a somewhat different overall operation, as will now be described relative to the portion of the overall process flow shown in FIG. 3d, which has specific application to the system of FIG. 2b.

Whether pre-stored within positioning circuitry 25' or received by wireless transmission, pointing device 10' accesses data corresponding to positioning target image content generated by target generator 23 and included in the displayed image I, in process 46. These data may be the positioning target image content data itself (e.g., positioning target PT1 of FIG. 3b), or alternatively may be some type of representational data (e.g., x-y positions, orientation, etc.) from which positioning circuitry 25' can determine the location and other attributes of the positioning target image content. In process 40", positioning circuitry 25' in pointing device 10 identifies one or more positioning targets (e.g., positioning target $PT1_C$) within captured image CI, and determines such positioning target attributes as size, orientation, and the like, as desired.

In the system of FIG. 2b, in which positioning circuitry 25' is provided within pointing device 10', positioning circuitry 25' executes process 47 to identify the relation between positioning targets in captured image CI and positioning targets within displayed image I (as communicated from computer 22 in process 46). This operation corresponds essentially to process 41 of FIG. 3c, but is performed in pointing device 10' rather than at computer 22 (FIG. 2a). And in process 48, image capture and positioning circuitry 16' of pointing device 10' determines the location of display 20 at which it was itself pointing at the time of image capture, based on the relative attributes derived in process 47. Upon determining its pointed-to location of display 20, pointing device 10' then transmits data to computer 22 identifying that pointed-to location in process 49, along with any commands or other user inputs (e.g., input via actuator 15), via the wireless link established by transmitter 18 and receiver 24. Computer 22 can then respond to these commands in its operation and display of images I, in the desired interactive manner from process 44, as described above.

Further in the alternative, as also suggested by FIG. 2b, positioning circuitry 25, 25' that calculates and determines the location of display 20 at which pointing device 10, 10' is aimed can be distributed throughout the system, with portions at both pointing device 10, 10' and at computer 22, that each perform some part of the positioning function. For example, positioning circuitry 25' at pointing device 10' can calculate attributes (e.g., x-y position, target size, orientation, etc.) of positioning target image content contained within its captured image CI, and then forward that information to positioning circuitry 25 deployed near computer 22, which completes the determination of the pointed-to location of display 20. It is contemplated that the particular distribution of positioning functionality and computational resources among the various system elements can be designed for particular implementations by those skilled in the art having reference to this specification, without undue experimentation.

Given this generalized description, various embodiments of this invention directed to the manner in which positioning target information is generated and displayed at display 20, and some of the benefits attained by way of those embodiments of the invention, will now be described.

Human-Imperceptible Positioning Targets

As discussed above in the Background of the Invention, many conventional approaches to the positioning of remote pointing devices include use of human-perceptible content in the displayed image to recognize the location of the display pointed to by the pointing device. In some cases, visible cursors constitute the positioning targets, with the pointed-to location determined by comparing the location and attributes of the cursor in the captured image to that of the cursor as displayed. In other cases, the visible content of the image, or indeed the corners of the displayed image itself, is involved in the positioning process. However, the use of otherwise perceptible images or cursors in the displayed image can be distracting to the audience, especially if the display system is being used as a "white board" upon which the presenter is drawing or writing visual content. Those conventional visible-target systems cannot function in a strictly "white board" application, of course, because there is no visual content displayed that can be used in the positioning function. In addition, it has been observed, according to this invention, that these conventional approaches limit the usable range of the pointing device, in terms of distance from the display screen; the target as captured by the pointing device may be too big to be discerned if the pointing device is too close to the display, or too small to be discerned if the pointing device is too far away from the display.

According to embodiments of this invention, positioning of pointing device 10 (i.e., determining the location of display 20 at which pointing device 10 is aimed at, or pointing to, at a particular time) is performed using positioning targets that are not directly perceptible to the audience. In addition, embodiments of this invention perform such positioning using targets that are human-imperceptible, while still operating at the nominal frame rate of the display system, and without requiring hardware modifications to the display, such as additional projectors, special frame rate overlays, additional projection subsystems using invisible light such as infrared for the positioning targets, and the like.

Figure 4B:
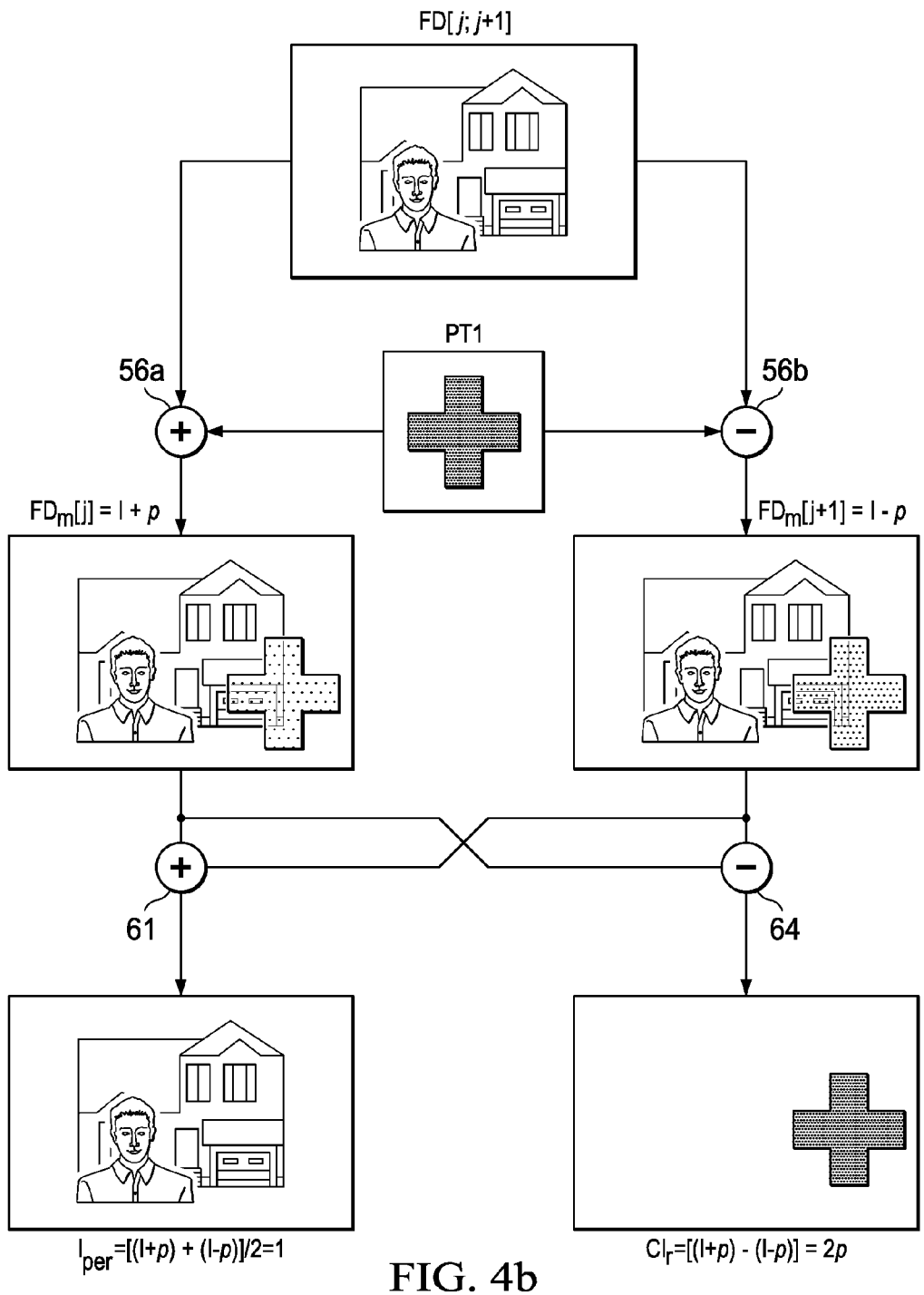
Figure 4C:
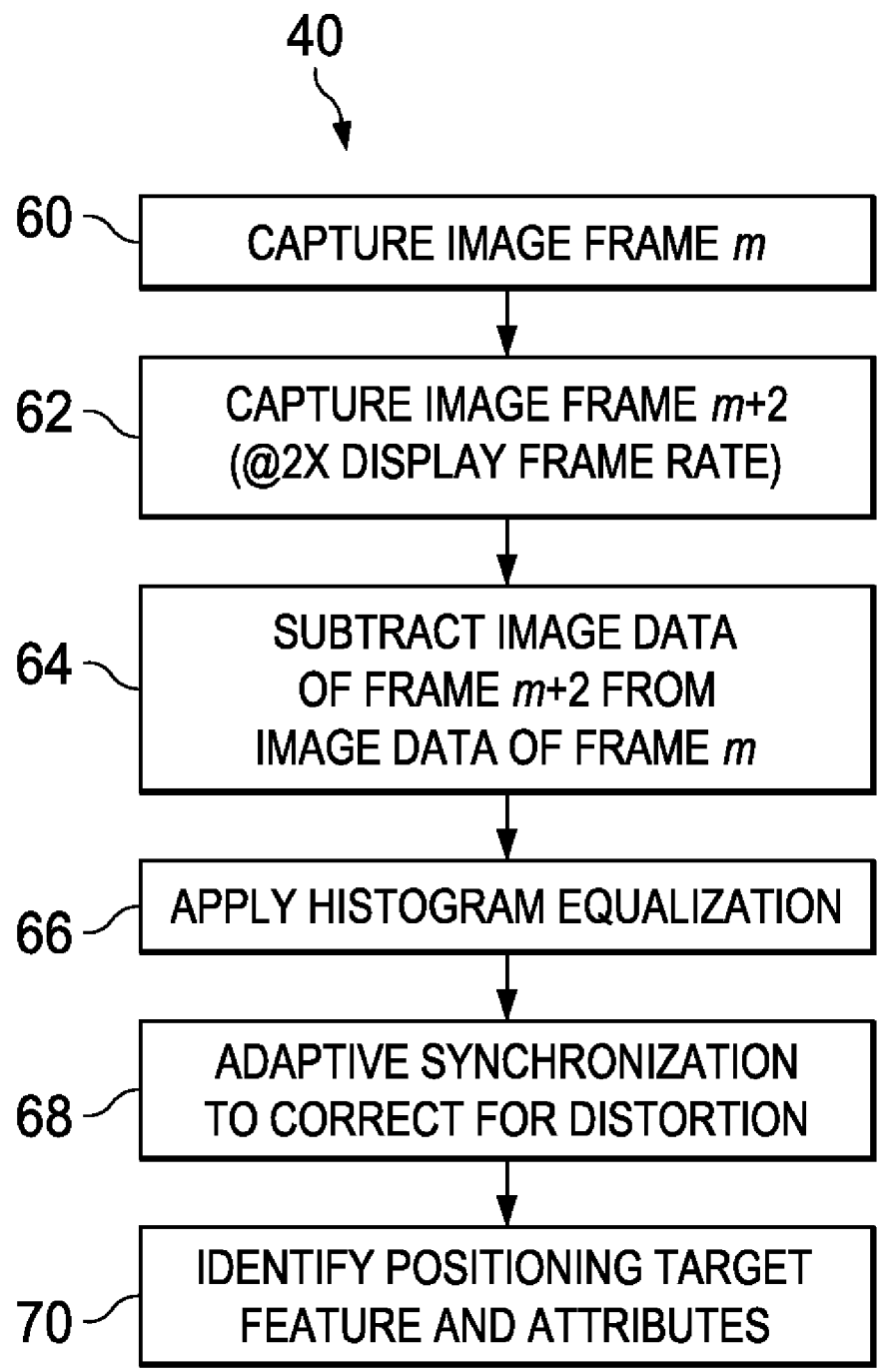
FIG. 4c is a flow diagram of a method of detecting a positioning target in a displayed image, according to embodiments of the invention.

FIGS. 4a through 4c illustrate an example of the generation, display, and detection of positioning targets in an interactive display system according to embodiments of the invention. It is contemplated that the operations described herein in this connection will be performed and executed by the appropriate components of the interactive display system, for example by way of target generator function 23 and graphics adapter 27 in the systems described above relative to FIGS. 2a and 2b. And it is also contemplated that this generation and display process can be carried out without requiring an increase in frame rates from the nominal rates currently used by modern conventional displays, of various types, such as on the order of 60 Hz. It is contemplated that those skilled in the art having reference to this specification can readily construct and program these various functions, including target generator function 23, to carry out the operations described herein, without undue experimentation.

As shown in the flow diagram of FIG. 4a, which describes the generation and display of a displayed image including visual payload image content and human-imperceptible positioning targets, computer 22 generates the visual payload image data to be displayed at display 20, in the form of frames of image data, in process 30. These visual payload image data correspond to the human-perceptible content intended for viewing by audience. Meanwhile, or in advance, target generator function 23 executes process 32 to generate one or more positioning targets to be overlaid onto the frame data generated in process 30, by or before graphics adapter 27. In process 50, the pattern shape or shapes of the positioning targets are retrieved from memory, or otherwise generated by target generator function 23. As mentioned above, multiple positioning targets may be displayed using different target shapes, to facilitate positioning of the pointed-to location. In process 52, one or more locations of the image to be displayed at display 20 are selected as the position at which the positioning targets derived in process 50 will be overlaid; this selection process 52 may simply retrieve previously determined display locations, or alternatively may be carried out in an interactive manner based on prior iterations of the positioning process.

According to embodiments of this invention, the positioning targets are applied to the image data generated in process 30 in the form of deviations from the pixel intensity values relative to the visual payload content. In other words, the positioning targets are applied as modulations of the intensity of the visual payload image data—each pixel within the positioning target area will have its intensity increased or reduced, from that indicated by the visual payload image data for that pixel. As shown in FIG. 4b, target generator function 23 selects an intensity Δ value p corresponding to the modulation involved in these positioning target patterns, in process 54.

According to this embodiment of the invention, the intensity Δ value for the positioning target pattern is alternately added to and subtracted from the visual payload image data over a sequence of image data frames. As will become apparent from this description, this approach results in the positioning targets being substantially human-imperceptible, yet remain "machine-perceptible" by positioning circuitry 25. As such, process 34 of combining visual payload with positioning target(s), described above in connection with FIG. 3a, is performed differently for different image frames. In this example of embodiments of the invention, graphics adapter 27 carries out combining process 34 as successive combining processes 34a, 34b for successive image data frames, as will now be described with reference to FIGS. 4a and 4b. As mentioned above, it is contemplated that graphics adapter 27 may be implemented as a single graphics adapter receiving inputs from computer 22 and from target generator function 23, or alternatively may be deployed in one or both of those two functions, or further in the alternative by way of graphics adapter circuitry within each of computer 22 and target generator function 23 feeding a downstream graphics adapter that presents the graphics output data to projector 21 or directly to display 20.

Combining process 34a begins with process 55a, in which visual payload image data from frame j are received. FIG. 4b illustrates a simplified example of frame data FD[j] for this image data frame j, showing the visual content intended for viewing by the audience. In process 56a, frame data FD[j] are combined with the positioning target by modifying the intensity data for those pixels within the positioning target shape, at the location selected in process 52, by the intensity Δ value determined in process 54. In this process 56a, for frame j, this intensity Δ value is added, on a pixel by pixel basis, to the intensity value for each pixel within the positioning target shape at its selected location. In this embodiment of the invention, the intensity values of pixels outside of the positioning target are not modified in process 56a. In other words, if the pixel at display location (x,y) has an intensity value $I_{x,y}$ in the payload image data, the result of process 56a will produce a modified pixel intensity value $I_{m\_x,y}$ as follows:

$$I_{m\_x,y} = I_{x,y} + p \quad (x, y) \in \text{positioning target}$$
$$= I_{x,y} \quad (x, y) \notin \text{positioning target}$$

FIG. 4b illustrates a simplified example of the result of addition 56a, by way of modified frame data $FD_m[j]$, in which the cross-shaped positioning target PT1 appears as brighter values at the selected location in the lower right-hand quadrant of the displayed image. In process 36a, these modified frame data $FD_m[j]$ for frame j are formatted for display, and forwarded to projector 21 for display at display 20.

Combining process 36b for the next frame j+1 of visual payload image frame data subtracts the intensity Δ value from the payload intensity for pixels within the positioning target(s). In process 55b, frame j+1 of the visual payload image frame data is received; in the simplified example of FIG. 4b, it is assumed that this payload image data does not substantially change from frame j to frame j+1 (i.e., FD[j]=FD[j+1]). In process 56b, the intensity value data for pixels of frame data FD within the positioning target are modified by subtracting intensity Δ value from the pixel intensity. The intensity values of pixels outside of the positioning target are not modified in process 56b. Similarly as above, for a pixel at display location (x,y) having an intensity value $I_{x,y}$ in the payload image data, the result of process 56b produces a modified pixel intensity value $I_{m\_x,y}$:

$$I_{m\_x,y} = I_{x,y} - p \quad (x, y) \in \text{positioning target}$$
$$= I_{x,y} \quad (x, y) \notin \text{positioning target}$$

As shown in FIG. 4b, modified frame data $FD_m[j+1]$ includes cross-shaped positioning target PT1 as dimmer values, at the same selected location in the lower right-hand quadrant of the displayed image. These modified frame data $FD_m[j+1]$ for frame j+1 are formatted for display, and forwarded to projector 21 for display at display 20, in process 36b.

For purposes of this description, the intensity modification applied for the positioning target is described in a monochromatic sense, with the overall intensity of each pixel described as modulated either brighter or dimmer at the positioning target. Of course, modern displays are color displays, typically realized based on frame data with different intensities for each component color (e.g., red, green, blue). As such, it is contemplated for some embodiments of this invention that the intensity of each component color would be modulated by ±p at the positioning target locations. In other embodiments of the invention, as will be described in further detail below, the modulation will vary from color to color.

Upon completion of combining process 34 and forwarding process 36 from frames j and j+1, the process is then repeated for the next frame j+2, as indicated in FIG. 4a by incrementing j=j+2 and the return of control to process 55a for that next frame j+2. As a result, a sequence of images are displayed at display 20, with one or more positioning targets appearing in successive frames, but alternating between being brighter and being dimmer in those successive frames. However, the response of the human eye is generally too slow to perceive individual display frames at modern frame rates on the order of 60 Hz or higher (e.g., display flicker is generally not human visible at display refresh rates of 60 Hz or higher). Rather, human viewers will tend to average the perceived displayed images, for example over a number of sequences. Referring to FIG. 4b, the result of this averaging will be to sum (adder 61) successive frames j, j+1, and then average the intensity over time. For those pixels within the positioning target, such averaging over two frames amounts to:

$$I_{per\_x,y} = \frac{(I_{x,y} + p) + (I_{x,y} - p)}{2} = I_{x,y} \quad (x, y) \in \text{positioning target}$$
$$= I_{x,y} \quad (x, y) \notin \text{positioning target}$$

As such, the human viewer naturally perceives the visual payload image data only, and does not directly perceive the positioning target or shape.

According to embodiments of this invention, however, the interactive display system is capable of detecting and identifying the positioning target included within the displayed image I. An example of detection process 40 will now be described with reference to FIG. 4c.

According to this embodiment of the invention, the camera and image capture functions of pointing device 10 can be constructed using conventional and commercially available "webcam" components. For ease of synchronization (or, more accurately, asynchronous operation), it is desirable that image capture function 16 of pointing device 10 operate at a frame rate that is about twice the frame rate of display 20, or higher. At this image capture frame rate, pointing device 10 operates to capture image frame m in process 60, and then image frame m+2 (which is two frames later at the image capture frame rate) in process 62. This operation of processes 60, 62, separated by two image capture sample periods, ensures that captured image frame m+2 captures an image with a positioning target overlaid with the opposite intensity Δ value from that of captured image frame m (e.g., frame data FD$_m$[j+1] and frame data FD$_m$[j] of FIG. 4b).

In process 64, positioning circuitry 25 (whether located at computer 22 as in FIG. 2a, or in pointing device 10' as in FIG. 2b), subtracts the image data of captured image frame m+2 from captured image frame m, on a pixel-by-pixel basis. As shown in FIG. 4b, subtraction 64 results in the visual payload image data effectively canceling out, and in reinforcement of positioning target PT1. In an ideal case, subtraction process 64 results in the following perceived intensity values:

$$I_{per\_x,y} = (I_{x,y} + p) - (I_{x,y} - p) = 2p \quad (x, y) \in \text{positioning target}$$
$$= 0 \quad (x, y) \notin \text{positioning target}$$

As such, after subtraction process 64, positioning device 10 perceives only the positioning target or shape, and does not perceive the visual payload image data. It is further contemplated that more than two frames may be captured and subtracted to recover the positioning targets, if desired for noise reduction. For example, frames m and m+1 can be summed together, with frames m+2 and m+3 summed together, and the difference of the summed frames used to recover the positioning target. These and other variations are contemplated to be within the scope of embodiments of this invention.

Conventional captured image processing is then applied to the result of subtraction process 64. In the embodiment of the invention shown in FIG. 4c, in process 66, a histogram equalization filter is applied. As known in the art, this histogram equalization corrects video data in a compressed range of pixel intensities, as is the case following subtraction process 64. Histogram equalization filter process 66 essentially redistributes the pixel intensities to equalize their distribution across the intensity range. In process 68, conventional adaptive synchronization is applied to the filtered positioning target image data, to correct for geometric distortions, as known in the art of digital watermark embedding and detection. Other image processing techniques may also be applied, as desired.

Upon the recovery and processing of positioning target image data from captured image frames m, m+2, process 70 is then performed by positioning circuitry 25 to identify the positioning target feature in the processed image data, if present. This identification can be performed by analysis of the data to determine whether a shape matching a known positioning target shape is present in the processed captured image data. If such a positioning target is identified, process 70 may also determine various attributes of the captured positioning target, including its x-y position in the captured image, the size of the positioning target feature, its rotational orientation, any shape distortion (which may indicate viewing of display 20 at an angle), and the like. Attribute determination process 40 (FIG. 3a) is thus complete, according to this embodiment of the invention. The detected attributes are then used to complete the positioning and identification of the interactive command, as described above relative to FIG. 3a.

According to embodiments of this invention, therefore, one or more positioning target features in the displayed images at display 20 are generated and detected in a way that is perceptible to positioning circuitry 25, yet that are imperceptible to audience A. In addition, this operation is performed at conventional nominal display frame rates, and without requiring modification of the projector, or other display 20. As such, embodiments of this invention can be used in connection with displays of various types, and with existing displays in a wide range of installations. Furthermore, the absence of human-perceptible positioning targets according to embodiments of this invention can increase the range of distances over which the interactive display system can be used, as will now be described with reference to FIGS. 5a and 5b.

Figure 5A:
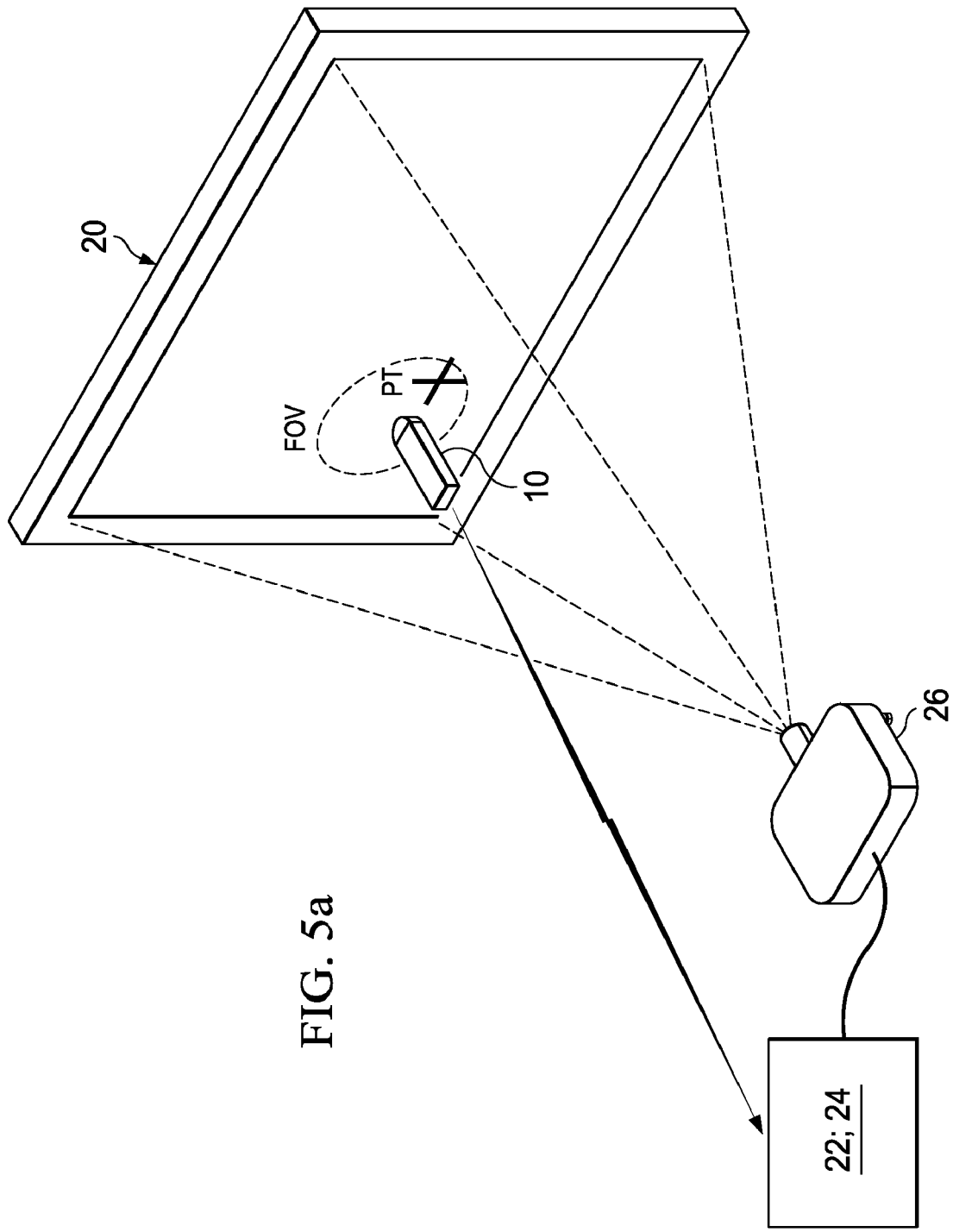
FIGS. 5a and 5b illustrate examples of distant and close-up positioning of a pointing device according to embodiments of the invention.
Figure 5B:
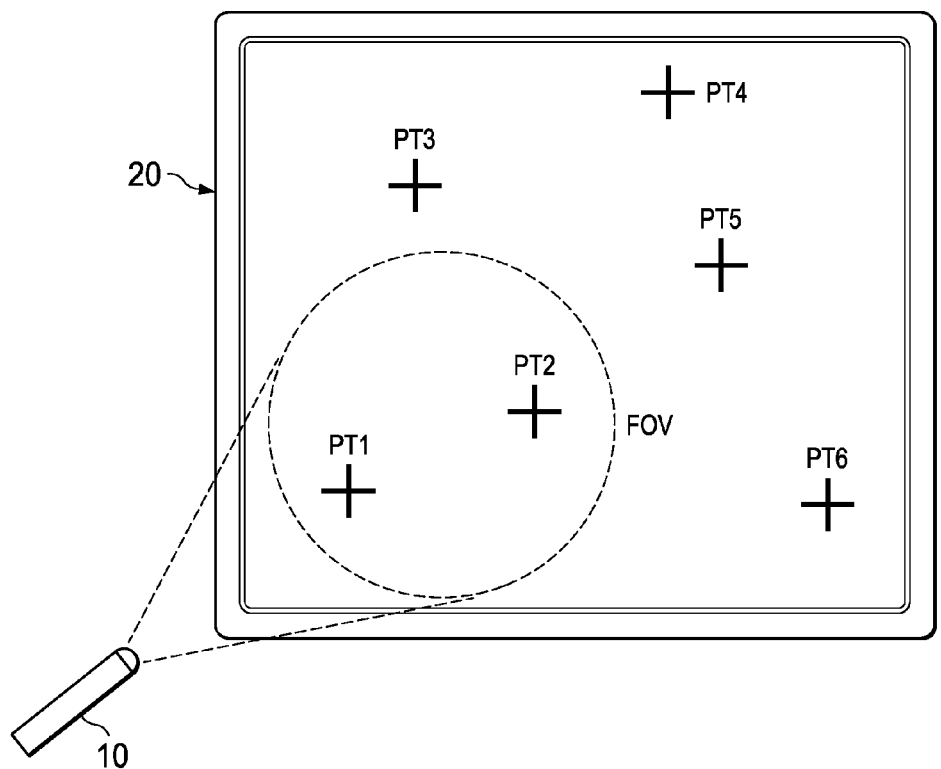

As shown in FIG. 5a, pointing device 10 is relatively close to display 20. As such, the field of view FOV of pointing device 10 is relatively small, and includes a single positioning target PT. This positioning target PT will appear relatively large within the image captured by pointing device. As such, positioning circuitry 25 can deduce not only the location of display 20 to which pointing device 10 is aimed, but can also deduce, from the size of a single positioning target PT within the images captured and recovered by pointing device 10, an indication that pointing device 10 is only a close distance away from display 20. Conversely, pointing device 10 is relatively far way from display 20 in the example of FIG. 5b. As such, the larger field of view FOV of pointing device 10 includes multiple positioning targets PT1, PT2 in this example, each of which will appear to be relatively small within the images captured by pointing device 10 (relative to the case of FIG. 5a). Positioning targets PT1 through PT6 may have different shapes or orientations from one another (not shown), to assist in the positioning process. Again, positioning circuitry 25 can determine not only the pointed-to location (i.e., the center of field of view FOV), but can also determine, from the number and size of positioning targets PT1, PT2 within the captured and recovered images.

It is also contemplated that the display and positioning process may be performed in a dynamic manner, with target generator function 23 generating positioning targets at locations, sizes, and appearance that depend on a previous iteration of the positioning process. Examples of this dynamic generation of positioning targets will be described below in connection with FIGS. 13a through 13e.

According to embodiments of this invention, the user of an interactive display system can thus interact with the visual content displayed at display 20, either based solely on the pointing to particular virtual "buttons", links, or other content displayed at display 20, whether at a long distance away from display 20 or approaching or even touching display 20. In this way, the user can interact with the visual content, in a manner corresponding to a graphical user interface ("GUI"). Various applications of this interaction are contemplated. A speaker can interact with a presentation being displayed at display 20, by selecting active content (e.g., Internet links, active icons, virtual buttons, streaming video, and the like), actuating advanced graphics and control of the presentation. Graphical user interface commands such as "select", click-and-drag, double-click, right-click, zooming in or out of the displayed content, page turning, and the like, are contemplated to be communicated from pointing device 10, based on the determined pointed-to locations of display 20.

In another context, pointing device 10 can be used as a game controller, allowing the user to operate and play a computer game being executed by computer 22; in this regard, inertial sensors such as accelerometers and the like included within pointing device 10 can be used to enhance inputs to the game from the user.

In another context, pointing device 10 can be used to issue commands in connection with the drawing of free-hand images and the writing of free-hand text, either on displayed content (for example to highlight or comment on that content), or on a blank "white board" display. Especially in this application, it is contemplated that the user can issue a "record" command (for example through the use of pointing device 10 itself pointing to an icon at display 20), in response to which computer 22 operates to store data in one of its memory resources, the stored data corresponding to subsequent operation of pointing device 10, including saving "virtual" writing or drawing made by pointing device 10 relative to display 20; in addition, it is contemplated that audio spoken by the user or by the audience may also be recorded to correspond to the saved virtual writing and drawing.

In any of these graphical user interface contexts, commands from the user issued via pointing device 10 can be interactively responded to be computer 22, generally by generating new visual payload image content to be displayed in response to the received user command. The overall display, positioning, and response process is then repeated, as described above.

It has been observed, in connection with this invention, that some aberrations due to the positioning target images can be perceived by the human audience in the displayed images, even according to embodiments of the invention as described above. According to various additional embodiments of this invention, the positioning targets can be generated in a manner that further reduces these visible aberrations, further improving the imperceptibility of the positioning targets to the audience, and thus further enhancing the audience experience. These various additional embodiments of the invention will now be described in further detail, it being understood that each of these embodiments of the invention may be used individually, or in any combination with one another or in combination with other variations, within the scope of this invention as claimed.

Inverse Gamma Positioning Target Generation

It has been observed, according to the invention, that positioning targets generated according to the generalized concept described above (i.e., simple addition and subtraction of intensity D value for each pixel in the positioning target), can result in the positioning targets being visible to human viewers in relatively light areas of the payload image, and conversely in poor visibility, to the pointing device, of the positioning targets in darker areas of the payload image. These artifacts are due to gamma correction in the display process. As known in the art, the intensity of each pixel as displayed is not based on a linear response to the output of graphics adapter 27. Rather, a "gamma" correction function is applied so that the displayed luminance L(I) for a pixel is a function of digital intensity value I (normalized to the range [0, 1]):

$$L(I) = CI^{\gamma} + b$$

where C is a constant related to the maximum brightness of display 20, b is the black level, and γ is the non-linearity of display 20 (typically ranging from 1.5 to 2.2). An example of this gamma correction function L(I) is shown by curve 71 of FIG. 6a. As such, modulation of intensity I by intensity Δ value p has less of an effect on the resulting luminance L(I) when I is closer to zero than to one. Conversely, modulation of intensity I by intensity Δ value p has more of an effect on the resulting luminance L(I) when I is close to one. This results in positioning targets being either visible in bright regions of the payload image (I close to one) or difficult to recover in dark regions of the payload image (I close to zero).

According to this embodiment of the invention, positioning targets are generated and applied by expressing intensity Δ value p as a function of digital intensity value I, with this function p(I) compensating for the gamma correction function. This operation is shown in FIG. 6b, in which the generation of positioning targets in process 32 (FIG. 4a) begins with retrieval of the positioning target shapes (process 50) and selection of the locations of the positioning targets (process 52) as before. In process 54', pattern intensity Δ base values $p_r$, $p_g$, $p_b$ are selected for the positioning targets for the red, green, and blue color component respectively. These bases value $p_r$, $p_g$, $p_b$ define the functions p(I) that will be applied to the visual payload image intensity data in the positioning targets.

Process 56a applies the positioning target overlay to frame j of the visual payload image data, as described above. In this embodiment of the invention, this process 56a is based on the received intensity values $I_{r,g,b}$ for each pixel in the payload image, and in particular for each pixel in the positioning targets. In process 72a, target generator function 23 calculates the intensity Δ value $p_r'(I_r)$ for the red component in the positioning target locations, in response to the intensity value $I_r$ for that pixel, according to the gamma correction function:

$$p_r' = (I_r + p_r)^{\left(\frac{1}{\gamma}\right)} - I_r^{\left(\frac{1}{\gamma}\right)}$$

Figure 6A:
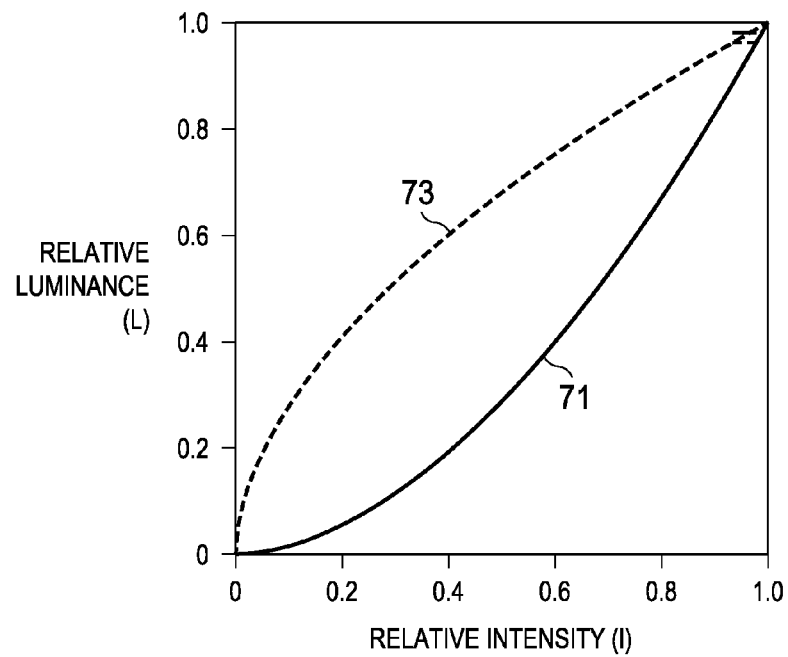
FIG. 6a is a plot of gamma and inverse gamma curves.
Figure 6B:
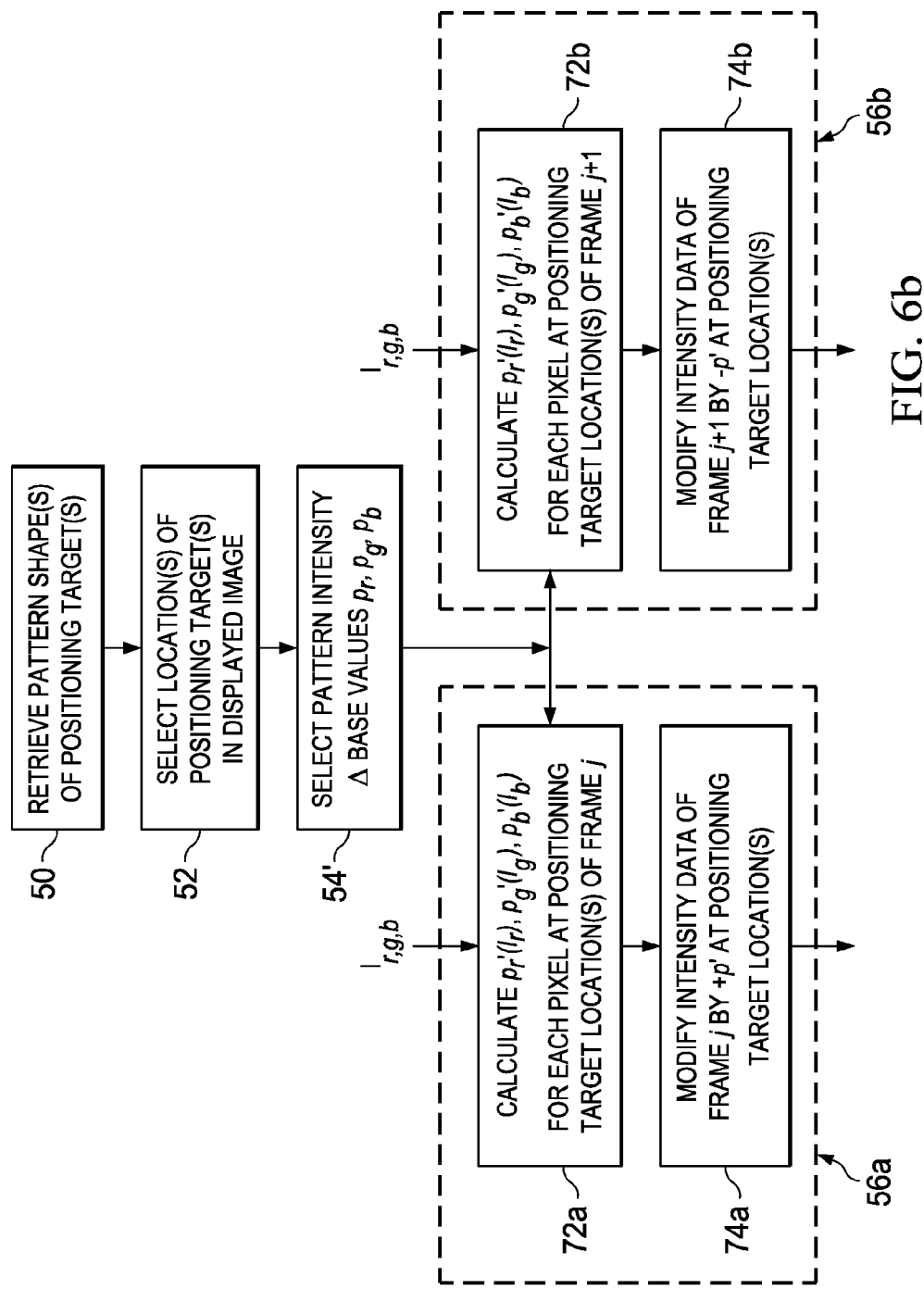
FIG. 6b is a flow diagram illustrating the application of the inverse gamma curve in the display of positioning targets according to an embodiment of the invention.

An example of this inverse gamma correction function is plotted in FIG. 6a by way of curve 73. Intensity Δ values $p_g'(I_g)$, $p_b'(I_b)$ for the green and blue components are similarly calculated, in response to the received intensity values $I_g$, $I_b$, respectively. Alternatively, a pixel brightness value may be calculated, based on a formula that takes into account the different human sensitivity to different colors, and the inverse gamma correction can then be applied to this pixel brightness value.

In process 74a, the intensity Δ values $p_r'(I_r)$, $p_g'(I_g)$, $p_b'(I_b)$ resulting from process 72 are then added to the received intensity values $I_{r,g,b}$ for each pixel in the positioning target locations of frame j. Similarly, process 72b calculates intensity Δ values $p_r'(I_r)$, $p_g'(I_g)$, $p_b'(I_b)$ for each pixel in the positioning target locations of the next frame j+1, in response to the received intensity values $I_{r,g,b}$ for each pixel in those locations. In process 74b, the received intensity values $I_{r,g,b}$ for each pixel in the positioning targets of frame j+1 are modified by subtracting the intensity Δ values $p_r'(I_r)$, $p_g'(I_g)$, $p_b'(I_b)$ calculated in process 72b. In each case, the modified frame intensity data are formatted as appropriate by graphics adapter 27 (including according to the gamma function for display 20), and then forwarded to projector 21 or directly to display 20 for presentation, in processes 36a, 36b (FIG. 4a).

According to this embodiment of the invention, therefore, the human perceptibility of the positioning targets is reduced in brighter regions of the payload image data, while maintaining detectability of those positioning targets in darker regions of that image. It is also contemplated that inverse gamma correction according to this embodiment of the invention will also enable the use of a smaller base intensity Δ value p, thus further reducing the presence of positioning target artifacts in the image as viewed by the audience.

Dispersed Regions of Flicker of Positioning Targets

In Park et al., "Undistorted Projection onto Dynamic Surface", *Advances in Image and Video Technology* (2006), pp. 582-90, pattern images are embedded into the displayed image for purposes of geometric correction, in applications in which the payload images are projected onto actual real-world objects and surfaces. As described in that article, for purposes of "augmented reality", the pattern images fill the entire screen. It is known, however, that the human eye is more sensitive to the sensation of flicker of larger display regions that are changing intensity, as described in Watson et al., "Window of visibility: a psychophysical theory of fidelity in time-sampled visual motion displays", *J. Opt. Soc. Am.*, Vol. 3, No. 3 (March, 1986), pp. 300-07.

Figure 7:
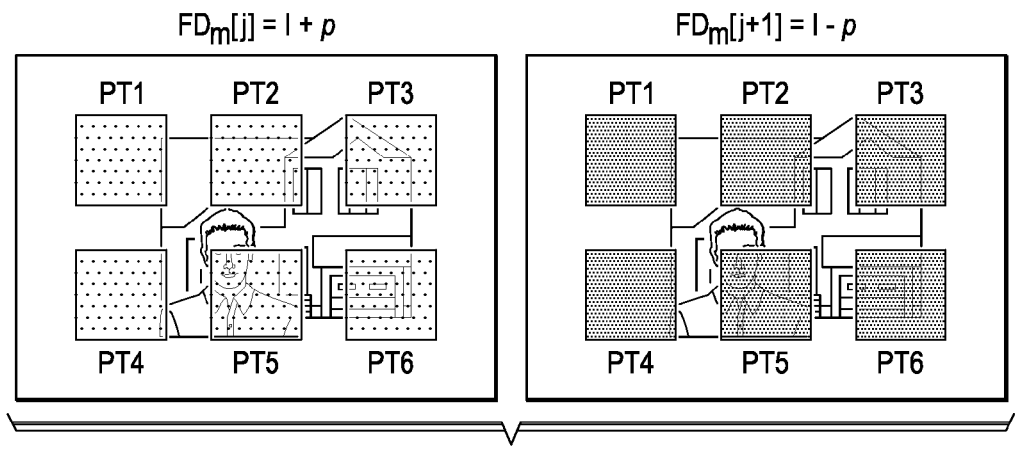
FIG. 7 illustrates an example of display of positioning targets according to an alternative embodiment of the invention in which less than the entire displayed image is included in the positioning targets.

According to another embodiment of the invention, therefore, the positioning targets cover only portions of each displayed image frame, rather than the entire image frame. FIG. 7 illustrates an example of this reduced coverage, using squares as the rudimentary positioning targets PT1 through PT6. Of course, as described above, the particular positioning target PT shape will generally be something other than a square, to facilitate detection of orientation of pointing device 10, to distinguish the various positioning targets PT1 through PT6 from one another, and to also detect off-axis location of pointing device 10. In any case, as evident from FIG. 7 for the examples of modified image frame data $FD_m[j]$, $FD_m[j+1]$, positioning targets PT1 through PT6 cover substantially less than the entire area of the displayed payload images. It is contemplated that even more positioning targets PT may be implemented, yet covering less of the overall display area.

As a result, it is contemplated that the sensation of display flicker potentially perceived by the audience will be reduced according to this invention, considering that only a fraction of the overall display area is being displayed from frame-to-frame with modulated intensity. Imperceptibility of the positioning target images is thus improved.

Un-Patterning of the Pattern of Positioning Targets

As described in Watson et al., "What does the eye see best?", *Nature*, 302(5907) (1983), pp. 419-22, the human eye is sensitive to the patterns occurring at certain spatial frequencies. This effect has been observed, according to this invention, by otherwise imperceptible patterns becoming perceptible if the pattern is overtly regular. According to this embodiment of the invention, the regularity of a pattern of positioning targets is disturbed by generating and overlaying a fainter pattern of positioning targets at a different spatial frequency. Referring now to FIG. 8, the generation of positioning targets with an irregular spatial frequency according to this embodiment of the invention will now be described. In particular, this embodiment of the invention is implemented within process 32 (FIG. 3a), in which the positioning targets are generated as described above.

The generation of positioning targets in this embodiment of the invention begins with process 50a, in which the pattern shape or shapes of a primary pattern of positioning targets are retrieved from memory, or are otherwise generated by target generator function 23. In process 52a, the locations of the image at which the primary positioning targets are to be displayed are selected; in this embodiment of the invention, as shown by primary positioning target pattern PTP1, this pattern is essentially periodic in the spatial sense. And as described above, target generator function 23 selects an intensity Δ value $p_1$ for this primary positioning target pattern in process 54a. This intensity Δ value $p_1$ will again correspond to a deviation (plus or minus) in intensity from the payload image data at pixel locations within the positioning targets.

In process 60, the two-dimensional spatial frequency $f_{xy1}$ of the primary positioning target pattern is determined or retrieved, at the case may be. It is contemplated that this spatial frequency can be determined in the conventional manner for image processing applications. Process 50b begins the generation of a secondary pattern of positioning targets that will overlay the primary positioning target pattern, and of course also the payload image data. According to this embodiment of the invention, this secondary pattern will have a two-dimensional spatial frequency $f_{xy2}$ that is higher than spatial frequency $f_{xy1}$ of the primary pattern, for example:

$$f_{xy2} = \frac{9 f_{xy1}}{4}$$

Of course, other spatial frequency multiples than 9/4 may alternatively be used. In process 52b, this secondary pattern is then generated as an overlay, given the boundaries of the displayed image and upon selection of a shape for the individual elements. As shown in FIG. 8, in this example, the positioning targets in secondary pattern PTP2 are each circular, while the positioning targets in primary pattern PTP1 are squares. Finally, in process 54b, a secondary intensity Δ value $p_2$ for this secondary pattern is selected. It is contemplated that this secondary intensity Δ value $p_2$ will be smaller in magnitude than the primary intensity Δ value $p_1$.

Alternatively, more complex positioning target patterns may be applied as secondary pattern PTP2. For example, a pattern of two-dimensional Gaussian curves has been observed to produce an effective masking pattern, from the standpoint of imperceptibility. However, such higher complexity secondary masking patterns can complicate the detection of the positioning targets.

FIG. 8 also illustrates a simplified example of the result of combining process 34a in which positioning target primary and secondary patterns PTP1, PTP2 overlay the payload image data of frame j. In this example, primary intensity Δ value $p_1$ and secondary intensity Δ value $p_2$ will be added (in intensity) to the pixel pattern of the payload image data. Some pixels will receive both the primary intensity Δ value $p_1$ adder and the secondary intensity Δ value $p_2$ adder, other pixels will receive one or other of these adders, and other pixels will remain at their intensity(ies) as determined by the payload image data. The resulting frame image data $FD_m[j]$ in this example is illustrated in FIG. 8, in simplified form.

According to this embodiment of the invention, the irregularity enforced by the secondary pattern PTP2 of positioning targets assists in rendering the positioning targets imperceptible to the audience, by disrupting spatial periodicity that may be present in the primary pattern of positioning targets. In addition, it has been observed that the overlay of the primary and secondary positioning targets can assist in the positioning process, by differentiating the positioning targets from one another. In the example of FIG. 8, the overlay may render the pattern such that no two squares in primary pattern PTP1 are alike. This information can be applied in the detection of individual positioning patterns upon image capture, and the determination of the pointed-to location by pointing device 10.

Background Flip

Figure 9:
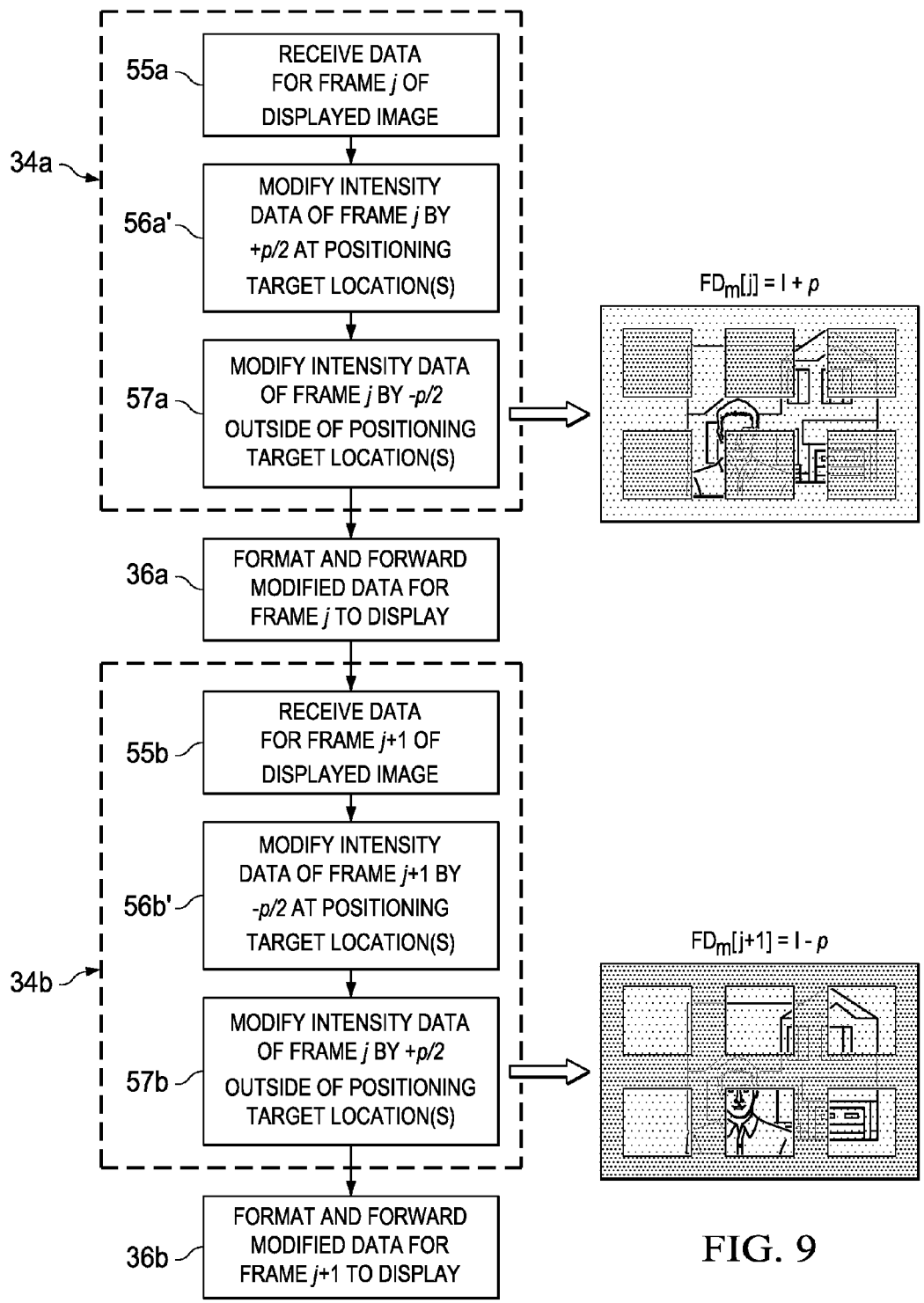
FIG. 9 is a flow diagram and corresponding example of an alternative embodiment of the invention in which the contrast of positioning targets is reduced by also modulating the background image.

As described above relative to FIG. 7, positioning targets PT in the form of a repeating pattern that does not fill the entire display 20 helps to reduce the perceptibility of the positioning targets to the human audience. According to another embodiment of the invention, which will now be described with reference to FIG. 9, imperceptibility of the positioning targets is further enhanced without reducing the detectability of the positioning targets PT. More specifically, according to this embodiment of the invention, the amplitude of the modulation of pixel intensity for pixels within the positioning targets PT can be reduced by as much as one-half, by also modulating the pixel intensity for pixels outside of the positioning targets in the opposite direction.

Processes 34a, 34b of applying the positioning targets PT to the visual payload image data, according to this embodiment of the invention, begin with process 55a in which the frame data FD[j] for frame j of the displayed image is received. In process 56a', for this frame j, a smaller intensity Δ value is added, on a pixel by pixel basis, to the intensity value for each pixel within the positioning target shape at its selected location. In this example, for a selected modulation intensity Δ value p, the addition of intensity within the positioning target shape is p/2. In process 57a, the intensity values for pixels outside of the positioning target locations and shapes is also modified, in this embodiment of the invention, but by subtracting reduced modulation intensity Δ value p/2 from those pixel intensities. As described above, processes 56a', 57a may modulate the intensity values for each of the component colors by these amounts, if desired. As a result, the intensity difference between pixels within the positioning targets and outside of the positioning targets remains p, but the maximum deviation of any pixel intensity from the payload data is limited to p/2. In frame j according to this example, therefore, the modified pixel intensities are expressed as:

$$I_{m\_x,y} = I_{x,y} + \frac{p}{2} \quad (x, y) \in \text{positioning target}$$
$$= I_{x,y} - \frac{p}{2} \quad (x, y) \notin \text{positioning target}$$

The modified frame data $FD_m[j]$ are then formatted, and forwarded to display 20 for presentation, in process 36a.

In process 55b, frame data FD[j+1] are received for the next frame j+1. These frame data FD[j+1] are similarly modified, but in the opposite polarity from that applied to frame j. Process 56b' subtracts reduced modulation intensity Δ value p/2 from the intensity values for each pixel within a positioning target, and process 57b adds reduced modulation intensity Δ value p/2 to the pixel intensities of each pixel outside of a positioning target. For this frame j+1, therefore, the modified pixel intensities are expressed as:

$$I_{m\_x,y} = I_{x,y} - \frac{p}{2} \quad (x, y) \in \text{positioning target}$$
$$= I_{x,y} + \frac{p}{2} \quad (x, y) \notin \text{positioning target}$$

The modified frame data $FD_m[j+1]$ are then formatted, and forwarded to display 20 for presentation, in process 36b.

Those skilled in the art having reference to this specification will readily comprehend that the differencing of modified frame data $FD_m[j]$ and modified frame data $FD_m[j+1]$ in the detection of the positioning targets will, as before, recover the positioning targets; the payload image data will again cancel out by virtue of this subtraction. Conversely, the natural averaging of the displayed modified frame data $FD_m[j]$ and modified frame data $FD_m[j+1]$, by the human viewer, will cancel out the modulation applied in processes 34a, 34b, including the modulation applied to pixels outside of the positioning targets. As such, the positioning targets will be imperceptible, even more so in this embodiment of the invention because the magnitude of the intensity modulation for any one pixel is reduced by one-half.

Simplified Color Weighting

As known in the art, the human eye is more sensitive to some colors than to others. More specifically, it has been shown that the human eye is less sensitive to blue than to red, and less sensitive to red than to green. For example, in computer displays and televisions, the relative response weighting of the typical human eye is about 0.29 to red, 0.11 to blue, and 0.59 to green. According to this embodiment of the invention, imperceptibility of the positioning targets is enhanced by selecting a color combination to which the human eye is least sensitive; the camera function of pointing device 10 does not (or need not) have the same relative sensitivity to colors as does the human eye, and thus can more readily "see" the positioning targets that the human eye can less readily see.

FIG. 10a illustrates one implementation of this embodiment of the invention, in which the relative color sensitivities of the human eye are exploited in rendering a less-perceptible positioning target, in combination with inverse gamma compensation as described above in connection with FIGS. 6a and 6b. Similar processes in FIG. 10a to those described above in connection with other embodiments of the invention will be referred to by the same or similar reference numerals.

Positioning targets are generated by target generator function 23 beginning with retrieval of the positioning target shapes (process 50) and selection of the locations of the positioning targets (process 52), as described above. In this embodiment of the invention, however, a pattern intensity contrast ratio c is selected in process 80; this contrast ratio is applied to individual color components according to the inverse of human sensitivity, as will become apparent from the following description.

In process 85, a set of inverse color weightings $w'_r$, $w'_g$, $w'_b$ are retrieved from memory, or are calculated by target generator function 23. These inverse color weightings $w'_r$, $w'_g$, $w'_b$ inversely correspond to the relative sensitivity of the human eye. For example, given a set of relative color sensitivities $w_r$, $w_g$, $w_b$ to red, green, blue, respectively, inverse color weightings $w'_r$, $w'_g$, $w'_b$ are calculated according to this embodiment of the invention as:

$$w'_r = \left[ w_r \left( \frac{1}{w_r} + \frac{1}{w_g} + \frac{1}{w_b} \right) \right]^{-1}$$

-continued $$w'_g = \left[w_g\left(\frac{1}{w_r} + \frac{1}{w_g} + \frac{1}{w_b}\right)\right]^{-1}$$

$$w'_b = \left[w_b\left(\frac{1}{w_r} + \frac{1}{w_g} + \frac{1}{w_b}\right)\right]^{-1}$$

For example, if the set of relative color sensitivities ($w_r$, $w_g$, $w_b$) to red, green, blue, respectively, has the value (0.29, 0.59, 0.11), the set of inverse color weightings ($w'_r$, $w'_g$, $w'_b$) derived in process 85 according to this implementation would be (0.24, 0.12, 0.64). As evident from this example, the blue component to which the human eye is least sensitive becomes the most heavily weighted color component in the positioning target image modulation, and vice versa.

The modification of pixel intensities in the payload image data, for pixels within the positioning targets, is again performed in process 56a, which begins in this case for frame j with process 82a, in which the brightness b for a given pixel in the positioning target locations is calculated. In this embodiment of the invention, process 82a calculates brightness b by applying the set of relative color sensitivities $w_r$, $w_g$, $w_b$ as perceived by a human viewer, to the intensity values $I_r$, $I_g$, $I_b$ of the payload image data for that pixel:

$$b = w_r I_r + w_g I_g + w_b I_b$$

As such, the perceived brightness b of this pixel corresponds to the perceived brightness of each of the color components for the payload image data intensity values.

In process 72a', an inverse gamma shift value c' is calculated, for each pixel in the positioning targets, based on this calculated brightness b and on the selected pattern intensity contrast c from process 80. In this embodiment of the invention, for example, inverse gamma shift value c' can be calculated as:

$$c' = (b+c)^{\frac{1}{\gamma}} - (b)^{\frac{1}{\gamma}}$$

As evident from this calculation of process 72a', the contrast value for the positioning targets is applied via inverse gamma correction, based on the brightness of the pixel in the payload image.

In process 74a', the modified intensity values $I'_r$, $I'_g$, $I'_b$ of the payload image data, incorporating the modulation applied for purposes of displaying the positioning targets, are generated for the color components of the current pixel. For example, the intensity value $I_r$, for the red component of a pixel in frame j residing in the positioning target location, is modulated according to the inverse gamma corrected shift by:

$$I'_r = I_r + c'(w'_r)$$

where $w'_r$ is the inverse color weighting for the red component, as determined in process 85. Similarly, modified intensity values $I'_g$, $I'_b$ of the payload image data for the green and blue components are similarly calculated in process 74a', in response to the received intensity values $I_g$, $I_b$, respectively. These data are then formatted and forwarded to display 20, as described above.

A similar modulation process 56b is carried out for pixels in the next successive frame j+1, except that the modulation of process 74b' is subtractive rather than additive. In short, process 82b calculates the brightness b for a given pixel in the positioning target locations, according to the relative color sensitivities $w_r$, $w_g$, $w_b$ applied to the intensity values $I_r$, $I_g$, $I_b$ of the payload image data for that pixel. And in process 72b', inverse gamma shift value c' is calculated for each pixel in the positioning targets, based on its calculated brightness b and the selected pattern intensity contrast c from process 80. In process 74b', for pixels in this frame j+1, the modified intensity values $I'_r$, $I'_g$, $I'_b$ of the payload image data are generated for the red, green, blue color components. This modulation is subtractive, rather than additive, for example by:

$$I'_r = I_r - c'(w'_r)$$

Modified intensity values $I'_g$, $I'_b$ of the payload image data for the green and blue components are similarly calculated in process 74b', for each positioning target pixel in this frame j+1. The data are formatted for display by graphics display 27, and forwarded to projector 21 or directly to display 20 for presentation to the audience, as described above.

In this embodiment of the invention, therefore, the modified intensity values $I'_r$, $I'_g$, $I'_b$ of the positioning target pixels are modulated in a manner that includes inverse gamma correction, and in a manner that more heavily weights the modulation toward color components that are less perceptible to the human audience. Of course, the camera function of pointing device 10 will perceive the modulation properly, upon its image capture.

According to a variation of this embodiment of the invention, as shown in FIG. 10b, a brightness calculation is not performed; rather, inverse gamma shifts are calculated for each color component for each pixel. As shown in FIG. 10b, processes 50, 52, 80, and 85 are executed by target generator function 23 as before, to define the contrast c and inverse color weightings $w'_r$, $w'_g$, $w'_b$ as before. For frame j, process 72a" is carried out to calculate inverse gamma shifts $c_r$, $c_g$, $c_b$ for the individual color components of red, green, blue, for each pixel in the positioning target locations. In this embodiment of the invention, the calculation of the individual color component inverse gamma shifts $c_r$, $c_g$, $c_b$ corresponds to:

$$c_r = \left[(I_r + c)^{\frac{1}{\gamma}} - (I_r)^{\frac{1}{\gamma}}\right] w'_r$$

$$c_b = \left[(I_b + c)^{\frac{1}{\gamma}} - (I_b)^{\frac{1}{\gamma}}\right] w'_b$$

$$c_r = \left[(I_g + c)^{\frac{1}{\gamma}} - (I_g)^{\frac{1}{\gamma}}\right] w'_g$$

As evident from these calculations in process 72a", the contrast shift for each color component includes inverse gamma correction, as described above, as well as inverse weighting based on human perception by color. For pixels in frame j, the intensity values $I_r$, $I_g$, $I_b$ for a pixel in frame j residing in the positioning target location, is modulated in process 74a" to additively apply the calculated inverse gamma shifts:

$$I'_r = I_r + c_r$$

$$I'_g = I_g + c_g$$

$$I'_b = I_b + c_b$$

The modulated data are then formatted by graphics adapter 27 and forwarded to projector 21 or directly to display 20, as described above.

Pixels in the next successive frame j+1 are then processed in a similar manner, except that the modulation is subtractive rather than additive. In summary, process 72b" calculates the inverse gamma shifts $c_r$, $c_g$, $c_b$, for each color component of each pixel to be modulated, according to the intensity values for that pixel in the payload image data, and based on the desired contrast c and the inverse color weightings $w'_r$, $w'_g$, $w'_b$, in the same manner as described above in connection with process 72a". In process 74b", these inverse gamma shifts $c_r$, $c_g$, $c_b$, are applied to those payload image data to subtractively modulate the payload image data for the positioning target images, and on a component-by-component basis:

$$I'_r = I_r + c_r$$

$$I'_g = I_g + c_g$$

$$I'_b = I_b + c_b$$

The modulated data are then formatted and forwarded to display 20.

Similarly to the implementation shown in FIG. 10a, the modified intensity values $I'_r$, $I'_g$, $I'_b$ of the positioning target pixels each include additive modulation, applied in a manner that includes inverse gamma correction, and in a manner that more heavily weights the modulation toward color components that are less perceptible to the human audience. Of course, the camera function of pointing device 10 will perceive the modulation properly, upon its image capture.

In this embodiment of the invention, therefore, pixels in the positioning target locations are modulated, in complementary fashion from frame to frame, in a manner that is even further imperceptible to the human audience. This additional imperceptibility stems from weighting of the modulation toward color components that are less perceptible to the human audience, and also by including inverse gamma correction. In addition, the modulation of positioning target pixels according to this embodiment of the invention can be executed in a more computationally efficient manner than brute force methods, such as averaging the intensity of each pixel based on its surrounding neighbors.

Edge Blurring

It has been observed, in connection with this invention, that the human eye is very sensitive to sharp edges of visible patterns, namely such sharp edges at which significant contrast in brightness or color occurs over a very short distance (e.g., between adjacent pixels). According to another embodiment of this invention, positioning targets included in the displayed images are generated in a manner that blurs the edges of those positioning targets.

Figure 11:
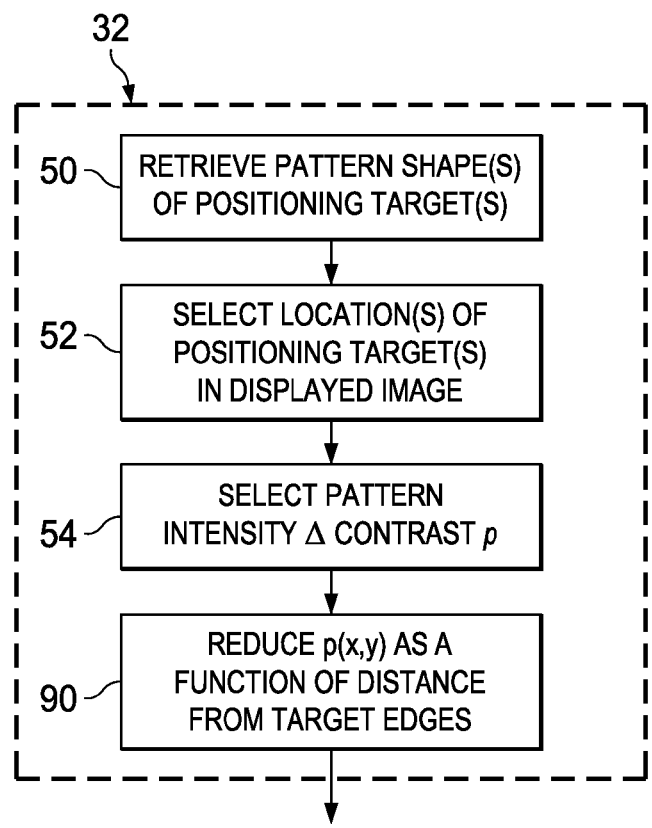
FIG. 11 is a flow diagram illustrating an alternative embodiment of the invention in which edges of the positioning targets are blurred, to further reduce human perceptibility.

FIG. 11 illustrates a method of blurring the edges in the positioning target shapes as will be applied to a frame of payload image data, for example as described above according to the various embodiments of this invention. In this embodiment of the invention, process 32 for generating one or more positioning targets to be overlaid onto the payload image frame data is performed. As described above, the pattern shape or shapes of the positioning targets are retrieved from memory, or otherwise generated by target generator function 23, in process 50. In process 52, the location or locations of the image to be displayed at display 20 at which the positioning targets are to appear are selected, either by retrieving previously determined display locations, or in an interactive manner based on prior iterations of the positioning process. And in process 54, intensity Δ value p of the positioning target or targets is selected, as before.

According to this embodiment of the invention, blurring process 90 is then applied, to blur the edges of the positioning targets and thus reduce their human perceptibility while still maintaining perceptibility for the purposes of positioning. For example, an edge region of the positioning target may be defined, over which a gradient reduction in value p is progressively applied until reaching the edge, or within which the value p in those edge regions is simply reduced from its full value. In one example, blur process 90 identifies width $P_w$ of the positioning target, identifies an edge distance as some fraction of that overall width (e.g., $P_w/15$), and applies a blur reduction in the value p for pixels within that distance from the edge of the positioning targets. The blurred values p(x,y), constituted by pattern intensity Δ value p as a function of pixel position within the positioning target, are then used in the modulation of the payload image data in each frame j, j+1, as described above.

This edge blurring can also be applied to other embodiments of this invention. For example, blurring can be implemented by reducing the contrast value c in the color-weighted position target generation described above relative to FIGS. 10a and 10b. It is contemplated that these and other variations of this embodiment of the invention can be readily implemented by those skilled in the art having reference to this specification. In any of these variations, the blurring of edges of positioning targets is applied to further render the positioning targets human-imperceptible, according to this embodiment of the invention.

Sequential Positioning

Each of the foregoing embodiments of the invention have been described above in a manner that is generic to the manner in which one or more positioning targets are included in the images presented at display 20. In other words, these previously-described embodiments of the invention are operable in connection with stationary positioning targets. Given these approaches to the positioning of a remote pointing device 10 relative to display 20, it is also contemplated, according to other embodiments of this invention, that the positioning of pointed-to display location can be efficiently performed by way of time-sequencing of the targets displayed. In addition, it is contemplated that these other embodiments of the invention can be applied to conventional positioning methods, including the display of human-visible positioning targets.

Figure 12:
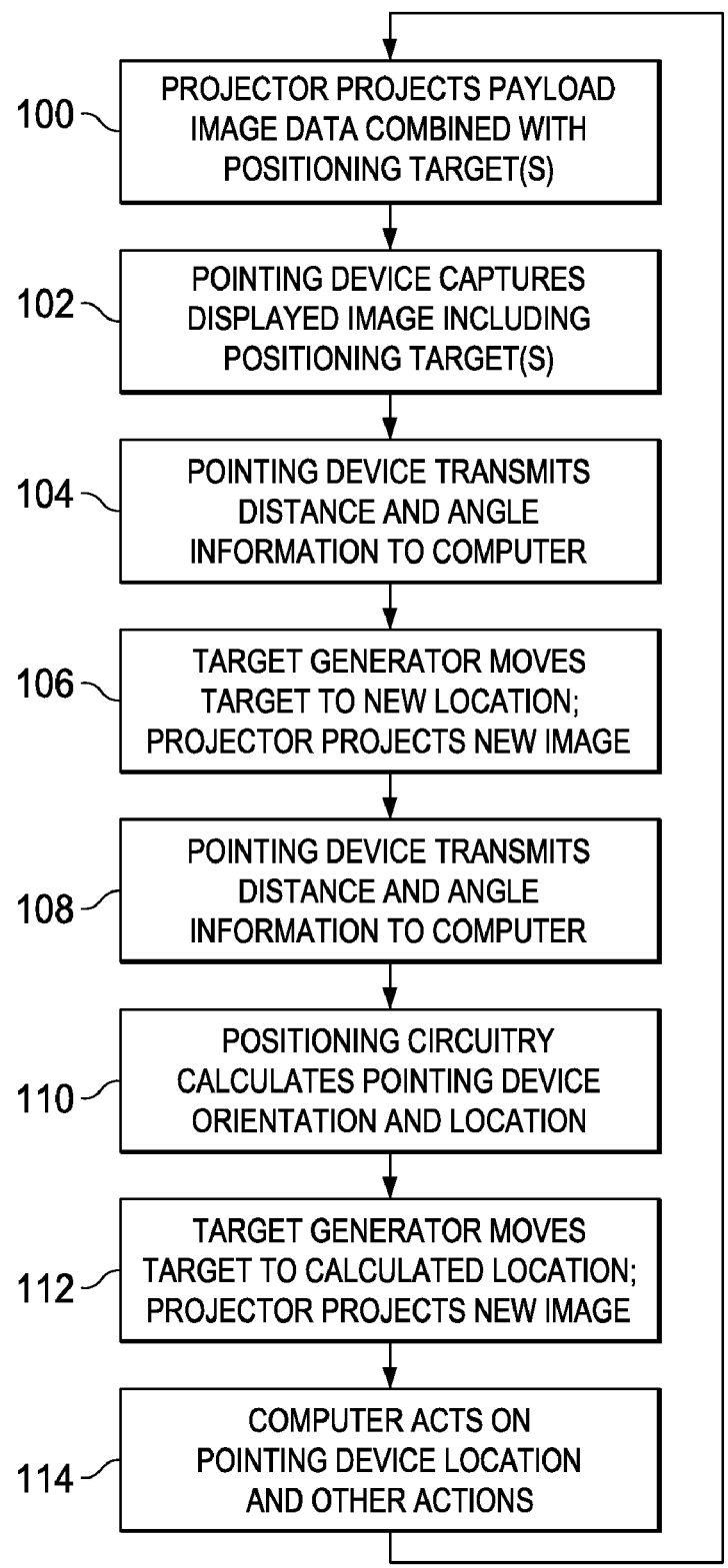
FIG. 12 is a flow diagram illustrating a method of operating an interactive display system according to another embodiment of the invention, in which multiple positioning targets are sequenced over time.

FIG. 12 illustrates a generalized method of sequential positioning according to these embodiments of the invention, particularly as applied to an interactive display system such as described above relative to FIG. 2b, in which positioning circuitry 25' carries out much of the positioning computations; some portion of positioning circuitry 25 may be deployed at computer 22 in this example, as well. Of course, it is contemplated this embodiment of the invention can be readily applied to interactive display systems such as described above relative to FIG. 2a, in which pointing device 10 transmits image information to positioning circuitry 25, which in turn carries out the positioning computations. As such, and as mentioned above, positioning circuitry 25 may be deployed within pointing device 10, 10' or at computer 22, or distributed among both, as desired for a particular implementation. It is contemplated that those skilled in the art can readily adapted the method shown in FIG. 12 to that architecture, or to variations on these two examples as may be realized in a particular installation. In addition, the example illustrated in FIG. 12 will be described in connection with a projection system such as shown in FIG. 2b, it being understood that those skilled in the art can readily adapt this example to a direct display (e.g., LCD, LED, plasma display, etc.) system.

Figure 13A:
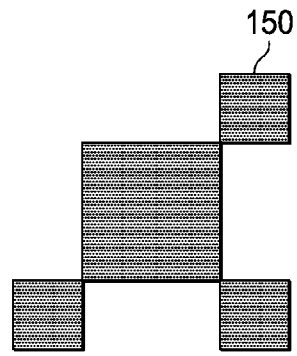
FIGS. 13a through 13e illustrate a nominal positioning target, distorted representations of that positioning target due to the location of the pointing device, and a compensating positioning target, according to another embodiment of the invention.

The sequential positioning process of this embodiment of the invention begins in process 100, in which graphics adapter 27 produces and projector 21 projects an image on display 20 that includes one or more positioning targets, for example as shown in FIG. 3b. This initial display process 100 selects and displays a positioning target of a size that can be discerned from pointing device 10 over a wide range of distances from display 20, whether relatively close or relatively far away. FIG. 13a illustrates one example of positioning target 150, which provides the benefit of being able to convey distance, rotation, angle from the screen, and other information regarding the location of pointing device 10 relative to display 20, as will be described in further detail below. It is contemplated that computer 22, target generator function 23, and graphics adapter 27 can present this displayed image with a positioning target periodically, or in each displayed frame; alternatively, it is contemplated that target generator function 23 and graphics adapter 27 may present the positioning target in displayed image data in response to user demand, for example by the user pressing actuator 15 of pointing device 10. In process 102, pointing device 10 captures the displayed image, including the positioning target displayed in process 100 (and over successive frames for the case in which human-imperceptible positioning targets are displayed, as described above). In this example, positioning circuitry 25' receives the captured image from image capture function 16, identifies a positioning target in its captured image, and calculates positioning information based on that image, for example as described above relative to FIG. 3b. In this example, it is contemplated that positioning circuitry 25' can determine the distance of pointing device 10 from display 20, and an angle at which pointing device 10 is located off the normal axis of display 20, based on attributes of the detected positioning target such as size, orientation, shape, and the like. In process 104, pointing device 10 transmits information corresponding to those distance and angle results to computer 22, via transceiver 18' and the wireless link.

In process 106, computer 22 repeats the process of generating images at display 20, including one or more positioning targets as generated by target generator function 23. In this repeated process, though, target generator function 23 will move the positioning targets to a different location from that of process 100, in response to the distance and angle results transmitted by pointing device 10 in process 104. The position of the new positioning targets, and other attributes as desired, are communicated to positioning circuitry 25' in pointing device 10', via transceivers 24', 18'. In effect, the movement of positioning target(s) between processes 100, 106 enables triangulation of the location of pointing device 10 relative to display 20, and provides increased accuracy in the calculations, considering that computer 22 is aware of the displayed locations and shapes of the positioning targets in each iteration. Positioning circuitry 25' calculates the distance of pointing device 10 from display 20, and the angle of pointing device 10 off the normal axis of display 20, and transmits that information to computer 22 in process 108.

Upon receiving both instances of distance and angle information from pointing device 10, positioning circuitry 25 at computer 22 then derives the orientation and pointed-to location of pointing device 10, relative to display 20, in process 110. It is contemplated that the computer program instructions according to which this process 110 is performed can be generated using conventional rudimentary navigational techniques, by those skilled in the art having reference to this specification. The result of this process 110 is a determination of the location of display 20 at which pointing device 10 is aimed (i.e., the pointed-to location). In the conventional manner for graphical user interfaces, it is this pointed-to location that is included in the determination of a user command received by computer 22 from pointing device 10.

In process 112, target generator function 23 generates a next positioning target in the image to be displayed at display 20 in response to the orientation and location. In this case, it is contemplated that target generator function 23 may place this next positioning target at a different location of the displayed image, such as a location that is closer to the pointed-to location of display 20 by pointing device 10. Other attributes of this next positioning target may also be changed by target generator function 23 in response to the distance and angle information, including the size of the positioning target (smaller if the distance between pointing device 10 and display 20 is short, larger if the distance is long). In addition, target generator function 23 may change the shape of the positioning target as displayed to improve detection by pointing device 10, for example by rotating the positioning target as displayed, and also by altering the shape to correct for distortion due to pointing device 10 being off-axis.

FIGS. 13a through 13e illustrate examples of how process 112 may alter the displayed positioning target in subsequent image frames, in response to the distance and angle information determined in process 110. As mentioned above, positioning target 150 as generated by target generator function 23 is illustrated in FIG. 13a, at a nominal size and orientation, for reference purposes. If captured image CI by pointing device 10 were to obtain a view of positioning target 150 at a similar size and orientation, the determination of the pointed-to location could be carried out to a high degree of accuracy. According to this embodiment of the invention, process 112 changes the attributes of the positioning targets to optimize the determination of the pointed-to location of display 20 by positioning circuitry 25, 25'. It is contemplated that this modification of the positioning targets in response to the results of a prior captured image need not be carried out in connection with the particular navigation determination described herein with reference to FIG. 12 (i.e., processes 100 through 110), but may be useful in connection with any manner in which the pointed-to location of display 20 is calculated or determined.

Figure 13B:
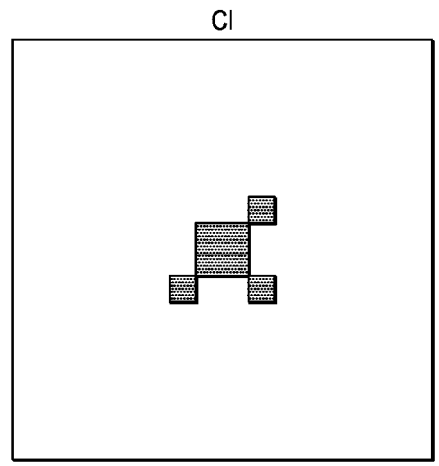
Figure 13C:
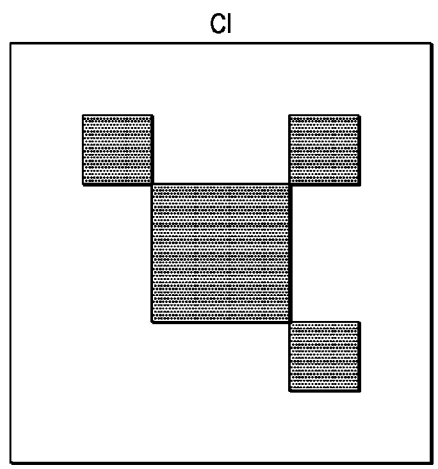

FIG. 13b illustrates captured image CI for an example in which pointing device 10 is relatively far from display 20. In this example, accordingly, positioning target 150 is relatively small within captured image CI. In process 112 in this example, target generator function 23 can increase the size of positioning target 150 as overlaid onto the displayed image, thus providing pointing device 10 with a larger target, and enabling positioning circuitry 25 to more easily and accurately derive the pointed-to location of the displayed image. In FIG. 13c, the size of the positioning target within captured image CI is optimal, but positioning device 10 is rotated 90° clockwise from its nominal orientation to display 20, causing the image to appear rotated 90° counter-clockwise. Positioning circuitry 25 may not be able to as readily identify the pointed-to location due to this rotation. As such, in process 112, target generator function 23 may rotate the orientation of positioning target 150 as displayed (e.g., by 90° clockwise), so that captured image CI will contain an image of positioning target 150 closer to its nominal view shown in FIG. 13a.

Figure 13D:
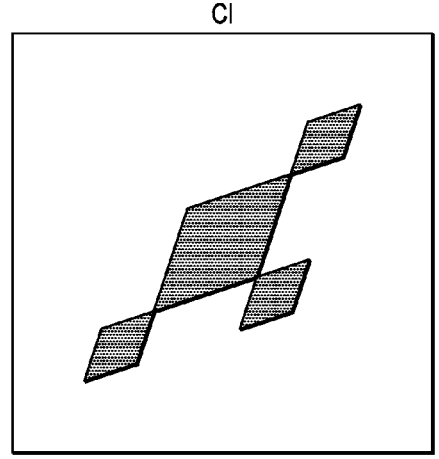
Figure 13E:
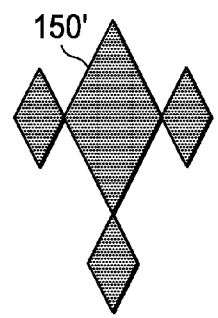

FIG. 13d illustrates an example of captured image CI acquired by pointing device 10 from a location severely off-axis from the normal to display 20. This particular view of display 20 appears to be from a location below and to the right-hand side of display 20. In this example, the positioning target within captured image CI is distorted because of the off-axis position of pointing device 10. An automated image comparison of this captured positioning target with nominal positioning target 150 of FIG. 13a will be relatively difficult, given the severe distortion in captured image CI, and thus the poor matching between the two images. Upon an approximate determination of the location of pointing device 10 relative to display 20, as determined from the distorted captured image CI shown in FIG. 13d, according to this embodiment of the invention, target generator function 23 can compensate for that distortion by generating positioning target 150' of FIG. 13e, which is distorted and rotated in the opposite manner as that in captured image CI of FIG. 13d and displayed in process 112. A captured image from the same location as in the case of FIG. 13d will result in a representation of the positioning target that is much closer to that of FIG. 13a, improving the ability of positioning circuitry 25, 25' to identify the pointed-to location of display 20.

As mentioned above, inertial sensors 17 may be deployed within pointing device 10. Examples of these inertial sensors 17 include accelerometers, magnetic sensors, gyroscopes, and the like. In another embodiment of the invention, inputs from one or more of those inertial sensors 17 may assist in the determination of the angle, rotation, and position of pointing device 10 relative to display 20, particularly if captured image CI includes significant rotation, translation, or distortion of the captured positioning target, and especially if pointing device 10 is being moved quickly "across" display 20. For example, if positioning is being performed at twice the display frame rate (e.g., 120 Hz), the actual pointed-to location at display 20 can move dramatically within the 8.33 msec of two frame periods. In this case, the sensing of relative motion (as opposed to absolute location) by an inertial sensor 17 can provide an indication of the rotation, angle, or movement of pointing device 10 for times between the determinations of positioning circuitry 25. Smoother and more accurate determination of the location of display 20 at which pointing device 10 is aimed can thus be provided by the combination of the visual and inertial positioning systems.

Other correction of subsequent instances of the positioning target as displayed in process 112 can include changes of color to compensate for color distortion, improving the sharpness of the positioning target (e.g., eliminating the edge blurring of the positioning target as described above) in response to poor quality capture of the positioning target in the captured images, and compensation for shaking or vibration of pointing device 10 by way of moving the placement of positioning target in the opposite manner from frame to frame.

Referring back to FIG. 12, in process 114, now that the pointed-to location of display 20 has been determined, computer 22 then acts according to the pointed-to location and any additional user command (such as a "click" of actuator 15 on pointing device 10). As known in the art for such graphical user interfaces, such commands can include click-and-drag movement of content, selection of a live "link", button, pulldown or other menu, draw or free-hand text entry (as in the case of a "white board" application), highlighting of a portion of the displayed image, and the like. In addition, certain user commands may not necessarily depend on precise positioning, for example a page turn command entered by the user holding down actuator 15 while sweeping the aim of pointing device across the screen.

It is further contemplated that multiple pointing devices 10 may be simultaneously used by the speaker or present, so that a "multi-touch" interface command can be given and interpreted, for example to zoom the displayed image. For example, multiple positioning targets of different "colors" (i.e., variations from the displayed content in different color components) may be used, with different ones of the pointing devices 10 tracking the different color component positioning targets. Alternatively, a "supertarget" positioning target with multiple resolution features (e.g., self-similar shape features, in the fractal sense) can be used to enable rapid and accurate positioning determinations over varying distances from display 20.

Other actuators or sensors, such as accelerometers and other inertial sensors 17, that are also deployed within pointing device 10 may also be involved in the user command to which computer 22 responds in process 114, as mentioned above.

According to this embodiment of the invention, such additional navigation can include sensing by computer 22 or pointing device 10 of its very close proximity to display 20, for example enabling the operation of the interactive display system as a virtual "touchscreen". In this regard, a touch sensor may also be employed within pointing device 10, by way of which an action may be taken if the user touches or closely approaches display 20 with pointing device 10, for example to "draw" on the displayed image. In another implementation, an accelerometer as inertial sensor 17 within pointing device 10 can sense a sudden "jab" of pointing device 10 by the user, which can be used to indicate a "tap" by pointing device 10 of the image at display 20, mimicking touch screen operation even though pointing device 10 may be relatively distant from display 20 itself. In this manner, an accelerometer or other inertial sensor can operate as actuator 15 of pointing device 10 (FIGS. 2a and 2b), without requiring an external button or other switch. It is contemplated that these and other variations in the operation of this system will be apparent to those skilled in the art having reference to this specification.

As a result of the user command executed in process 114, computer 22 will then typically project a new payload image at display 20, for viewing and further interaction by the user via pointing device 10. The operation of the interactive display system of this embodiment of the invention will then begin again from process 100.

It is contemplated that this embodiment of the invention can provide great benefit in the operation of an interactive display system. In particular, the interactive display and detection of positioning targets allows for adjustment in the size and attributes of the positioning targets according to such variables as distance from the display, angle of the pointing device off the normal axis of the display, perceptibility of the pointing target by positioning circuitry in the system, and the like.

According to this embodiment of the invention, therefore, multiple positioning targets, either human-perceptible or human-imperceptible, are involved in the positioning of the pointed-to location of a hand-held pointing device, and in the operation of an interactive display system. This approach to positioning takes advantage of the computational power and miniaturization of modern computer circuitry, and enables rapid, accurate, and imaginative operation of presentation systems before a wide range of audiences.

CONCLUSION

The various embodiments of this invention as described in this specification, and variations thereof that will be apparent to those skilled in the art having reference to this specification, provide important advances in the implementation and operation of interactive display systems. It is further contemplated that those advances will have significant benefit not only in system construction, but also in the carrying out of presentations to audiences of various sizes. To summarize, these embodiments of the invention operate by positioning the location of a displayed image at which a pointing device is aimed, based on the display and detection of positioning targets in that image. In several of these embodiments of the invention, the positioning targets are rendered especially imperceptible to the human audience, reducing distractions caused by such targets while enabling deployment of targeting information over a wide range of the display, and also enabling "white board" uses of the interactive display system. Furthermore, embodiments of this invention carry out this positioning continuously and seamlessly over a wide range of distances between the pointing device and the display screen, including at distances approaching or touching display screen itself. In addition, embodiments of this invention can be readily adapted to existing display systems, including projection systems, flat-panel displays, and the like, and without requiring special projection or display equipment or retrofit of the displays. In addition, it is contemplated that a single pointing device can be used in connection with each and every type of display, rather than being dedicated to one type of display.

While the present invention has been described according to its various embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of interactively and remotely operating a computer system, comprising:
   generating visual payload image frame data;
   combining, with the visual payload image frame data, at least one positioning target pattern corresponding to complementary intensity variances at one or more selected pixel locations of the visual payload image frame data, applied in successive frames;
   displaying the combined visual payload image frame data and positioning target pattern on a display;
   capturing image data representative of at least a portion of the display including the positioning target, over at least two frames;
   processing image data to subtract frames of the captured image data from one another to recover the positioning target pattern as viewed remotely from the display; and
   determining a pointed-to location of the display responsive to the recovered positioning target pattern;
   wherein the combining step comprises, for each pixel at which the positioning target pattern is to be displayed:
   determining an intensity component value for at least one color component of the visual payload image frame data at that pixel;
   calculating at least one variance value responsive to the intensity component value at that pixel, and according to an inverse gamma correction function;
   in a first frame, adding a calculated variance value to the visual payload image frame data for that pixel; and
   in a second frame, subtracting a calculated variance value from the visual payload image frame data for that pixel.

2. A method of interactively and remotely operating a computer system, comprising:
   generating visual payload image frame data;
   combining, with the visual payload image frame data, at least one positioning target pattern corresponding to complementary intensity variances at one or more selected pixel locations of the visual payload image frame data, applied in successive frames;
   displaying the combined visual payload image frame data and positioning target pattern on a display;
   capturing image data representative of at least a portion of the display including the positioning target, over at least two frames;
   processing image data to subtract frames of the captured image data from one another to recover the positioning target pattern as viewed remotely from the display;
   determining a pointed-to location of the display responsive to the recovered positioning target pattern;
   generating a first plurality of positioning targets corresponding to regions of intensity variance of a first magnitude, arranged in a pattern over the area of the display at a first two-dimensional spatial frequency; and
   generating a second plurality of positioning targets corresponding to regions of intensity variance of a second magnitude that is less than the first magnitude, arranged in a pattern over the area of the display at a second two-dimensional spatial frequency that is greater than the first two-dimensional spatial frequency; and
   wherein the combining step comprises:
   additively combining the first and second pluralities of positioning targets with the visual payload image frame data in a first frame; and
   subtractively combining the first and second pluralities of positioning targets with the visual payload image frame data in a second frame adjacent in time to the first frame.

3. A method of interactively and remotely operating a computer system, comprising:
   generating visual payload image frame data;
   selecting a location of the display at which a positioning target pattern is to be displayed;
   combining, with the visual payload image frame data, a positioning target pattern corresponding to complementary intensity variances at one or more selected pixel locations of the visual payload image frame data within the selected location, applied in successive frames;
   displaying the combined visual payload image frame data and positioning target pattern on a display;
   capturing image data representative of at least a portion of the display including the positioning target, over at least two frames;
   processing image data to subtract frames of the captured image data from one another to recover the positioning target pattern as viewed remotely from the display; and
   determining a pointed-to location of the display responsive to the recovered positioning target pattern;
   wherein the combining step comprises:
   in a first frame:
      subtracting an intensity variance from the visual payload image frame data to be displayed at each pixel within the selected location; and
      adding an intensity variance to the visual payload image frame data to be displayed at pixels not within the selected location; and
   in a second frame, adjacent in time to the first frame:
      adding an intensity variance to the visual payload image frame data to be displayed at each pixel within the selected location; and
      subtracting an intensity variance from the visual payload image frame data to be displayed at pixels not within the selected location.

4. A method of interactively and remotely operating a computer system, comprising:
   generating visual payload image frame data;
   combining, with the visual payload image frame data, at least one positioning target pattern corresponding to complementary intensity variances at one or more selected pixel locations of the visual payload image frame data, applied in successive frames;

displaying the combined visual payload image frame data and positioning target pattern on a display;

capturing image data representative of at least a portion of the display including the positioning target, over at least two frames;

processing image data to subtract frames of the captured image data from one another to recover the positioning target pattern as viewed remotely from the display; and determining a pointed-to location of the display responsive to the recovered positioning target pattern;

wherein the combining step comprises:

determining a pattern intensity contrast value;

determining inverse color weightings of color components for pixels located within a positioning target, the inverse color weightings inversely corresponding to a relative perceptibility by the human eye of each of the color components;

for each pixel at which the positioning target pattern is to be displayed in a first frame:
  determining a brightness value of the visual payload image frame data at that pixel;
  responsive to the pattern intensity contrast value and the brightness value of that pixel, calculating an inverse gamma shift value for the pixel;
  calculating a color-weighted variance factor for each color component of the visual payload image frame data of that pixel, responsive to the inverse gamma shift value for the pixel and the inverse color weightings of the color components; and
  additively applying that color-weighted variance factor to the visual payload image frame data of that pixel; and for each pixel at which the positioning target pattern is to be displayed in a second frame adjacent in time to the first frame:
  determining a brightness value of the visual payload image frame data at that pixel;
  responsive to the pattern intensity contrast value and the brightness value of that pixel, calculating an inverse gamma shift value for the pixel;
  calculating a color-weighted variance factor for each color component of the visual payload image frame data of that pixel, responsive to the inverse gamma shift value for the pixel and the inverse color weightings of the color components; and
  subtractively applying that color-weighted variance factor to the visual payload image frame data of that pixel.

5. A method of interactively and remotely operating a computer system, comprising:

generating visual payload image frame data;

combining, with the visual payload image frame data, at least one positioning target pattern corresponding to complementary intensity variances at one or more selected pixel locations of the visual payload image frame data, applied in successive frames;

displaying the combined visual payload image frame data and positioning target pattern on a display;

capturing image data representative of at least a portion of the display including the positioning target, over at least two frames;

processing image data to subtract frames of the captured image data from one another to recover the positioning target pattern as viewed remotely from the display; and determining a pointed-to location of the display responsive to the recovered positioning target pattern;

wherein the combining step comprises:

determining a pattern intensity contrast value;

determining inverse color weightings of color components for pixels located within a positioning target, the inverse color weightings inversely corresponding to a relative perceptibility by the human eye of each of the color components;

for each pixel at which the positioning target pattern is to be displayed in a first frame:
  calculating an inverse gamma shift value for each color component of the visual payload image frame data for the pixel, responsive to the pattern intensity contrast value and to intensity data for each color component of the visual payload image frame data for the pixel;
  calculating a color-weighted variance factor for each color component of the visual payload image frame data of that pixel, responsive to the inverse gamma shift values for the pixel and the inverse color weightings of the color components; and
  additively applying that color-weighted variance factor to the visual payload image frame data of that pixel; and for each pixel at which the positioning target pattern is to be displayed in a second frame adjacent in time to the first frame:
  calculating an inverse gamma shift value for each color component of the visual payload image frame data for the pixel, responsive to the pattern intensity contrast value and to intensity data for each color component of the visual payload image frame data for the pixel;
  calculating a color-weighted variance factor for each color component of the visual payload image frame data of that pixel, responsive to the inverse gamma shift values for the pixel and the inverse color weightings of the color components; and
  subtractively applying that color-weighted variance factor to the visual payload image frame data of that pixel.

6. A method of interactively and remotely operating a computer system, comprising:

generating visual payload image frame data;

selecting an intensity modulation value for at least one positioning target pattern;

determining a magnitude of complementary intensity variance by reducing the intensity modulation value for pixels in the positioning target pattern within a boundary region from edges of the positioning target pattern;

combining, with the visual payload image frame data, at least one positioning target pattern corresponding to complementary intensity variances at one or more selected pixel locations of the visual payload image frame data, applied in successive frames;

displaying the combined visual payload image frame data and positioning target pattern on a display;

capturing image data representative of at least a portion of the display including the positioning target, over at least two frames;

processing image data to subtract frames of the captured image data from one another to recover the positioning target pattern as viewed remotely from the display; and determining a pointed-to location of the display responsive to the recovered positioning target pattern.

7. A method of interactively and remotely operating a computer system, comprising:
generating visual payload image frame data;
combining, with the visual payload image frame data, at least one positioning target pattern corresponding to complementary intensity variances at one or more selected pixel locations of the visual payload image frame data, applied in successive frames;
displaying the combined visual payload image frame data and positioning target pattern on a display;
capturing image data representative of at least a portion of the display including the positioning target, over at least two frames;
processing image data to subtract frames of the captured image data from one another to recover the positioning target pattern as viewed remotely from the display; and
determining a pointed-to location of the display responsive to the recovered positioning target pattern;
wherein the displaying step displays the combined visual payload image frame data and positioning target pattern on a display at a first frame rate;
wherein the step of capturing image data is performed at a second frame rate substantially twice the first frame rate;
and wherein the processing step processes captured image data in a first captured image frame, and a second captured image frame separated in time from the first captured image frame by two periods of the second frame rate.

8. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
a hand-held housing;
a camera disposed in the housing; and
video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames;
and wherein the target generating circuitry executes a plurality of operations comprising, for each pixel of a selected location at which the positioning target pattern is to be displayed:
determining an intensity component value for at least one color component of the visual payload image frame data at that pixel;
calculating at least one variance value responsive to the intensity component value at that pixel, and according to an inverse gamma correction function;
in a first frame, adding a calculated variance value from the visual payload image frame data for that pixel; and
in a second frame, subtracting a calculated variance value from the visual payload image frame data for that pixel.

9. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
a hand-held housing;
a camera disposed in the housing; and
video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames;
wherein the plurality of operations further comprises:
generating a first plurality of positioning targets corresponding to regions of intensity variance of a first magnitude, arranged in a pattern over the area of the display at a first two-dimensional spatial frequency; and
generating a second plurality of positioning targets corresponding to regions of intensity variance of a second magnitude that is less than the first magnitude, arranged in a pattern over the area of the display at a second two-dimensional spatial frequency that is greater than the first two-dimensional spatial frequency; and
and wherein the graphics output circuitry combines the visual payload data with the at least one positioning target pattern by executing a plurality of operations comprising:
additively combining the first and second pluralities of positioning targets with the visual payload image frame data in a first frame; and
subtractively combining the first and second pluralities of positioning targets with the visual payload image frame data in a second frame adjacent in time to the first frame.

10. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
   a hand-held housing;
   a camera disposed in the housing; and
   video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames, by executing a plurality of operations comprising:
   in a first frame:
      subtracting an intensity variance from the visual payload image frame data to be displayed at each pixel within the selected location; and
      adding an intensity variance to the visual payload image frame data to be displayed at pixels not within the selected location; and
   in a second frame, adjacent in time to the first frame:
      adding an intensity variance to the visual payload image frame data to be displayed at each pixel within the selected location; and
      subtracting an intensity variance from the visual payload image frame data to be displayed at pixels not within the selected location.

11. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
   a hand-held housing;
   a camera disposed in the housing; and
   video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames;
wherein the target generating circuitry executes a plurality of operations comprising:
   determining a pattern intensity contrast value;
   determining inverse color weightings of color components for pixels located within a positioning target, the inverse color weightings inversely corresponding to a relative perceptibility by the human eye of each of the color components;
and wherein the graphics output circuitry combines the visual payload data with the at least one positioning target pattern by executing a plurality of operations comprises, for each pixel of the selected location at which the positioning target pattern is to be displayed in a first frame:
   determining a brightness value of the visual payload image frame data at that pixel;
   responsive to the pattern intensity contrast value and the brightness value of that pixel, calculating an inverse gamma shift value for the pixel;
   calculating a color-weighted variance factor for each color component of the visual payload image frame data of that pixel, responsive to the inverse gamma shift value for the pixel and the inverse color weightings of the color components; and
   additively applying that color-weighted variance factor to the visual payload image frame data of that pixel; and
for each pixel of the selected location at which the positioning target pattern is to be displayed in a second frame adjacent in time to the first frame:
   determining a brightness value of the visual payload image frame data at that pixel;
   responsive to the pattern intensity contrast value and the brightness value of that pixel, calculating an inverse gamma shift value for the pixel;
   calculating a color-weighted variance factor for each color component of the visual payload image frame data of that pixel, responsive to the inverse gamma shift value for the pixel and the inverse color weightings of the color components; and
   subtractively applying that color-weighted variance factor to the visual payload image frame data of that pixel.

12. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
   a hand-held housing;
   a camera disposed in the housing; and
   video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;

wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames;
wherein the target generating circuitry executes a plurality of operations comprising:
  determining a pattern intensity contrast value;
  determining inverse color weightings of color components for pixels located within a positioning target, the inverse color weightings inversely corresponding to a relative perceptibility by the human eye of each of the color components;
and wherein the graphics output circuitry combines the visual payload data with the at least one positioning target pattern by executing a plurality of operations comprises, for each pixel of the selected location at which the positioning target pattern is to be displayed in a first frame:
  calculating an inverse gamma shift value for each color component of the visual payload image frame data for the pixel, responsive to the pattern intensity contrast value and to intensity data for each color component of the visual payload image frame data for the pixel;
  calculating a color-weighted variance factor for each color component of the visual payload image frame data of that pixel, responsive to the inverse gamma shift values for the pixel and the inverse color weightings of the color components; and
  additively applying that color-weighted variance factor to the visual payload image frame data of that pixel; and
for each pixel of the selected location at which the positioning target pattern is to be displayed in a second frame adjacent in time to the first frame;
  calculating an inverse gamma shift value for each color component of the visual payload image frame data for the pixel, responsive to the pattern intensity contrast value and to intensity data for each color component of the visual payload image frame data for the pixel;
  calculating a color-weighted variance factor for each color component of the visual payload image frame data of that pixel, responsive to the inverse gamma shift values for the pixel and the inverse color weightings of the color components; and
  subtractively applying that color-weighted variance factor to the visual payload image frame data of that pixel.

13. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
  a hand-held housing;
  a camera disposed in the housing; and
  video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the computer comprises processing circuitry for generating visual payload image data arranged in a plurality of frames;
wherein the graphics output circuitry combines the visual payload image frame data with the at least one positioning target pattern corresponding to complementary intensity variances at one or more selected pixel locations of the visual payload image frame data, applied in successive frames;
wherein the target generating circuitry executes a plurality of operations comprising:
  selecting a intensity modulation value for the positioning target; and
  determining a magnitude of the complementary intensity variance by reducing the intensity modulation value for pixels in the positioning target shape within a boundary region from edges of the positioning target shape.

14. An interactive display system, comprising:
a computer for generating display image data to be displayed on a display;
target generating circuitry for generating at least one positioning target pattern, the at least one positioning target pattern corresponding to complementary intensity variances to be applied to a portion of the visual payload image data in successive frames;
graphics output circuitry for combining the visual payload data with the at least one positioning target pattern into graphics output signals in a format suitable for display;
a pointing device, comprising:
  a hand-held housing;
  a camera disposed in the housing; and
  video capture circuitry for capturing image data obtained by the camera; and
positioning circuitry for subtracting successive frames captured by the pointing device from a display coupled to the computer to recover image data including the target pattern, and for determining a location of the display at which the pointing device is aimed;
wherein the video capture circuitry captures image data at substantially twice the frame rate at which the display image data is generated;
and wherein the positioning circuitry is for subtracting captured image data in a first captured image frame from a second captured image frame separated in time from the first captured image frame by two periods of the video capture frame rate.

15. A method of interactively and remotely operating a computer system, comprising:
generating visual payload image frame data;
combining, with the visual payload image frame data, a first positioning target pattern at a first location in an image to be displayed;
displaying the combined visual payload image frame data and first positioning target pattern on a display;
at a first pointing device, capturing image data representative of at least a portion of the display including the first positioning target pattern;
processing the captured image data to determine an angle and distance of the first pointing device from the display;

combining, with the visual payload image frame data, a second positioning target pattern at a second location in an image to be displayed;

displaying the combined visual payload image frame data and second positioning target pattern on a display;

at the first pointing device, capturing image data representative of at least a portion of the display including the second positioning target;

processing the captured image data to determine an angle and distance of the first pointing device from the display; and determining a pointed-to location of the display responsive to the determined angles and distances based on the first and second positioning targets.

16. The method of claim 15, further comprising:

responsive to the determining of the pointed-to location, generating new visual payload image frame data; and displaying the new visual payload image frame data at the display.

17. The method of claim 16, further comprising:

receiving a user input from the pointing device;

wherein the step of generating new visual payload image frame data is performed also responsive to the received user input.

18. The method of claim 15, wherein the step of combining the first positioning target pattern with the visual payload image frame data comprises:

combining, with the visual payload image frame data, at least one positioning target pattern corresponding to complementary intensity variances at one or more selected pixel locations of the visual payload image frame data, applied in successive frames;

and wherein the step of combining the second positioning target pattern with the visual payload image frame data comprises:

combining, with the visual payload image frame data, at least one positioning target pattern corresponding to complementary intensity variances at one or more selected pixel locations of the visual payload image frame data, applied in successive frames.

19. The method of claim 15, further comprising:

generating the second positioning target pattern to have a compensated attribute responsive to a representation of the first positioning target in the captured image data.

20. The method of claim 15, further comprising:

at a second pointing device, capturing image data representative of at least a portion of the display including the first positioning target pattern;

processing the captured image data to determine an angle and distance of the second pointing device from the display;

at the second pointing device, capturing image data representative of at least a portion of the display including the second positioning target pattern;

processing the captured image data to determine an angle and distance of the second pointing device from the display;

and wherein the determining step also determines a pointed to location of the display for the second pointing device, responsive to the determined angles and distances for the second pointing device.

21. The method of claim 15, wherein the first positioning target pattern is displayed using a first color:

and further comprising:

repeating the combining and displaying steps for positioning targets displayed using a second color;

at a second pointing device, capturing image data representative of at least a portion of the display including the positioning target patterns displayed using a second color;

processing the captured image data to determine an angle and distance of the second pointing device from the display;

and wherein the determining step also determines a pointed to location of the display for the second pointing device, responsive to the determined angle and distance for the second pointing device.

22. A method of interactively and remotely operating a computer system, comprising:

generating visual payload image frame data;

combining, with the visual payload image frame data, a first positioning target pattern at a first location in an image to be displayed;

displaying the combined visual payload image frame data and first positioning target pattern on a display;

at a first pointing device located remotely from the display, capturing image data representative of at least a portion of the display including the first positioning target pattern;

generating a second positioning target pattern having a compensated attribute responsive to a representation of the first positioning target in the captured image data;

combining the second positioning target pattern with the visual payload image frame data;

displaying the combined visual payload image frame data and second positioning target pattern on a display;

at the first pointing device, capturing image data representative of at least a portion of the display including the second positioning target; and determining a pointed-to location of the display responsive to the captured image data including a representation of the second positioning target.

23. The method of claim 22, wherein the compensated attribute is the size of the second positioning target pattern.

24. The method of claim 22, wherein the compensated attribute is the rotational orientation of the second positioning target pattern.

25. The method of claim 22, wherein the compensated attribute is the shape of the second positioning target pattern.

26. The method of claim 22, wherein the compensated attribute is the location of the second positioning target pattern.

27. The method of claim 22, further comprising:

at a second pointing device, capturing image data representative of at least a portion of the display including the first positioning target pattern;

at the second pointing device, capturing image data representative of at least a portion of the display including the second positioning target pattern;

and wherein the determining step also determines a pointed to location of the display for the second pointing device.

28. The method of claim 22, wherein the first and second positioning target patterns are displayed using a first color:

and further comprising:

repeating the combining and displaying steps for positioning targets displayed using a second color;

at a second pointing device, capturing image data representative of at least a portion of the display including the positioning target patterns displayed using a second color;

and wherein the determining step also determines a pointed to location of the display for the second pointing device.

* * * * *